No. 610,216. Patented Sept. 6, 1898.
W. E. WILLIAMS.
WIRE FENCE MACHINE.
(Application filed Dec. 5, 1896.)
(No Model.) 12 Sheets—Sheet 1.
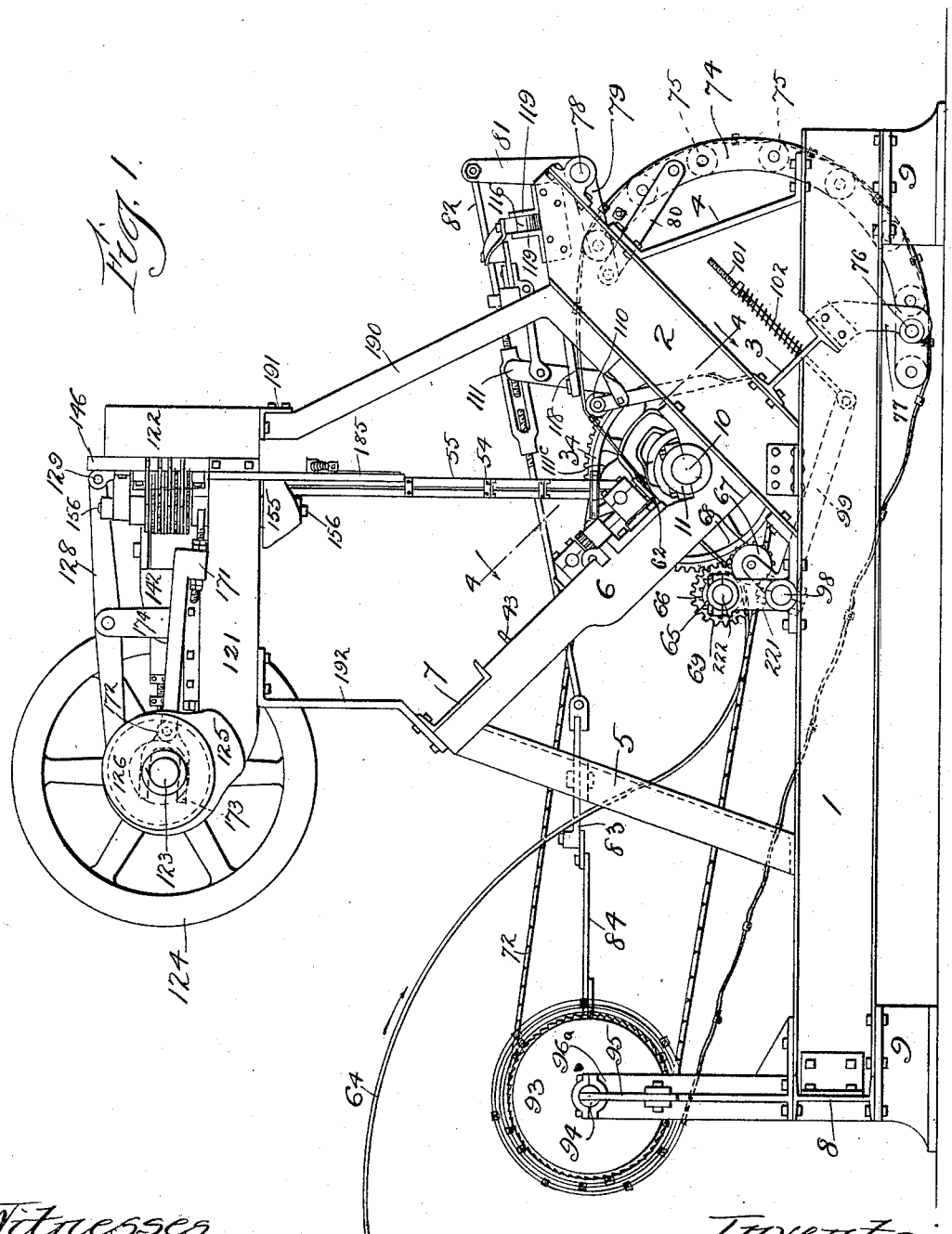

No. 610,216. Patented Sept. 6, 1898.
W. E. WILLIAMS.
WIRE FENCE MACHINE.
(Application filed Dec. 5, 1896.)
(No Model.) 12 Sheets—Sheet 2.
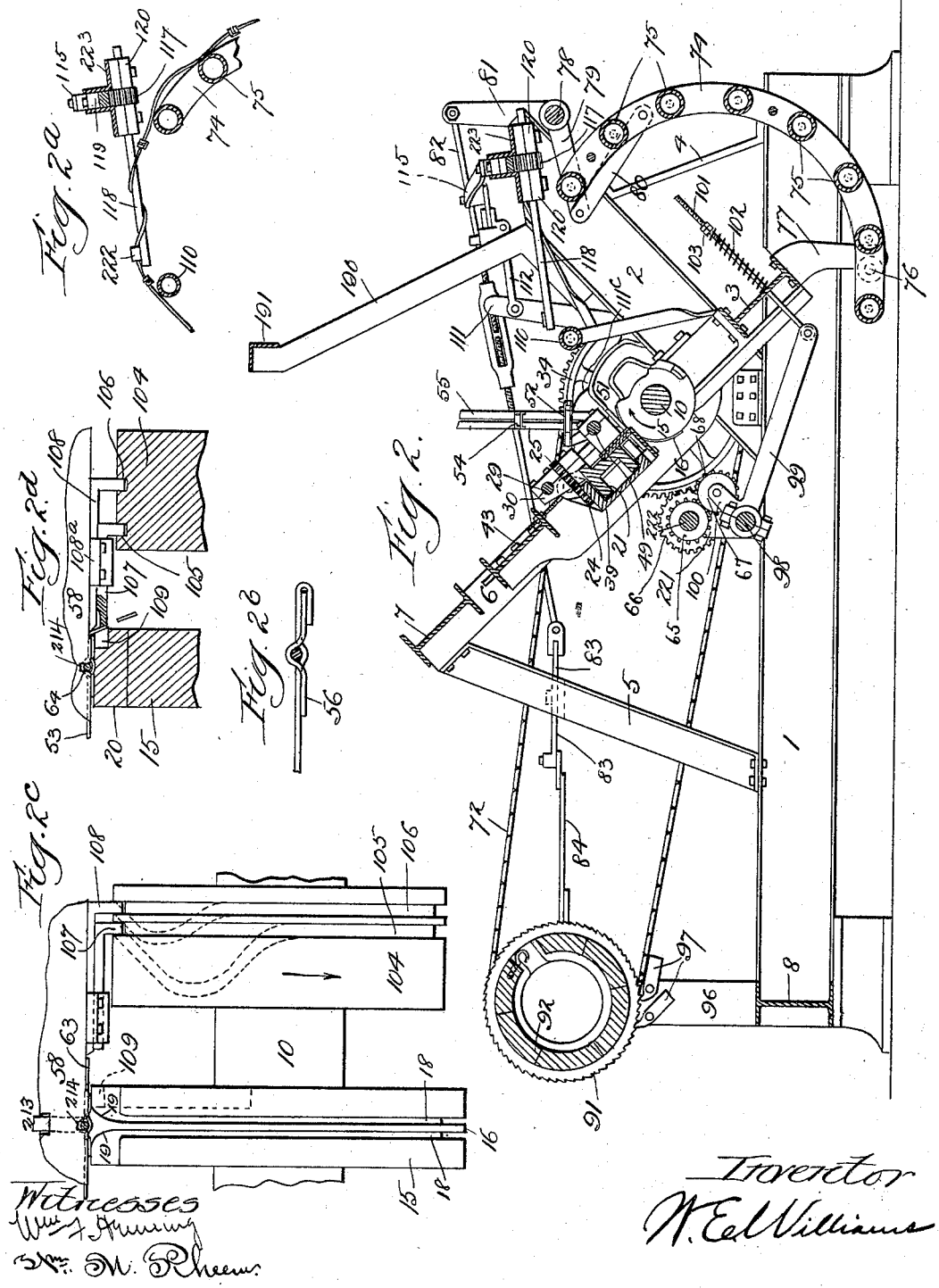

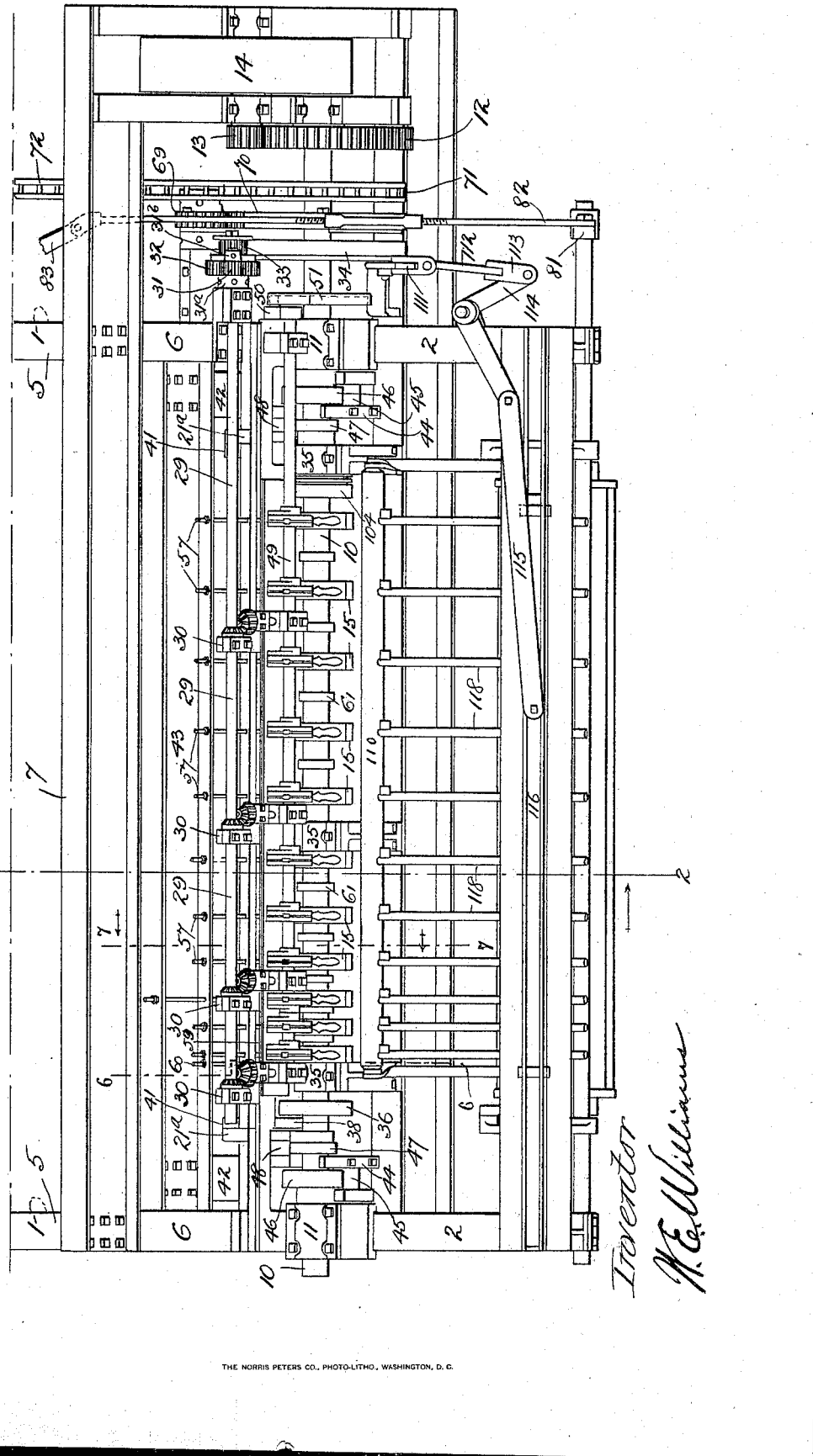

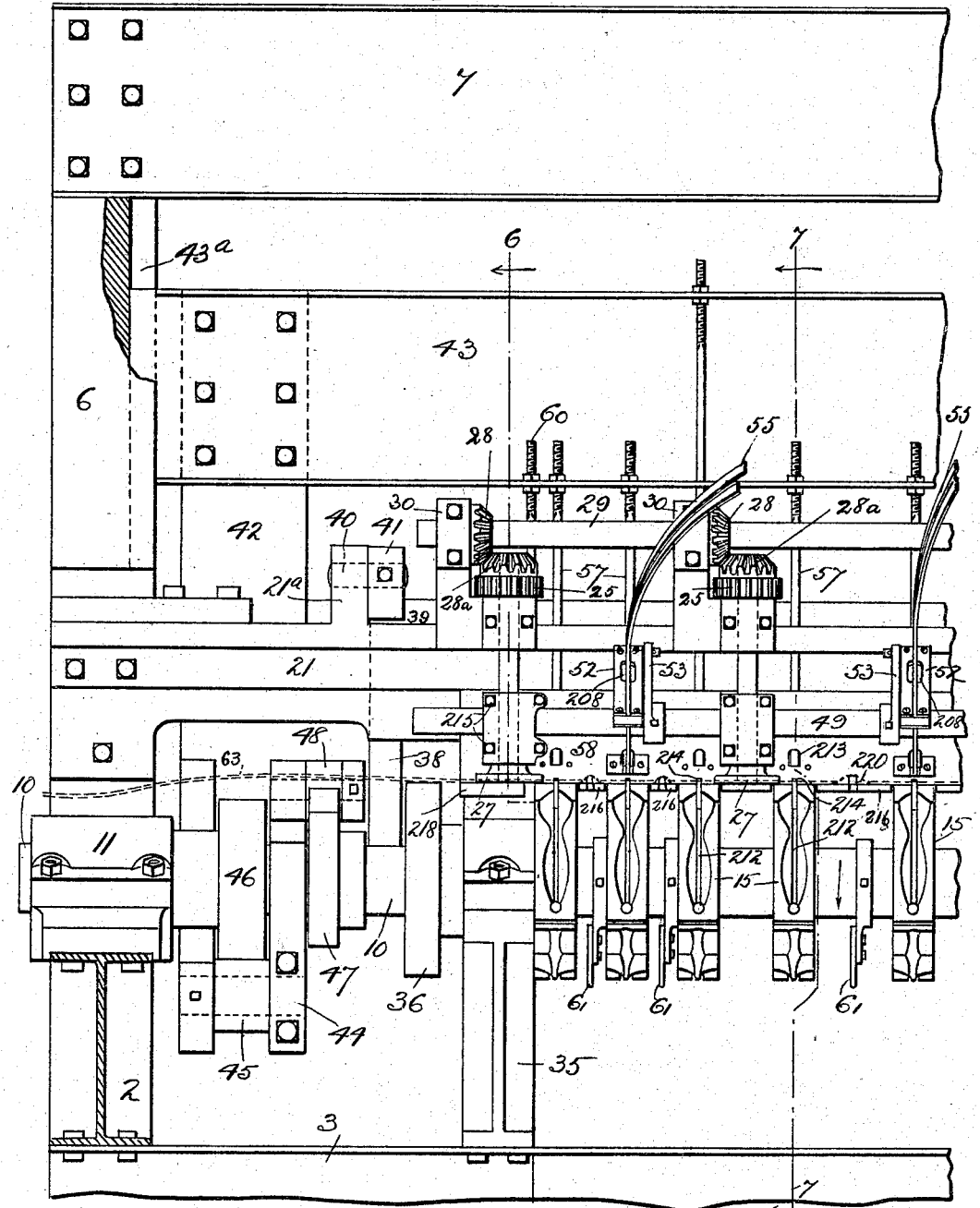
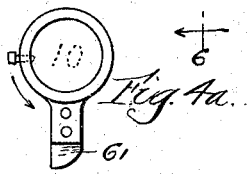

No. 610,216. Patented Sept. 6, 1898.
W. E. WILLIAMS.
WIRE FENCE MACHINE.
(Application filed Dec. 5, 1896.)
(No Model.) 12 Sheets—Sheet 5.
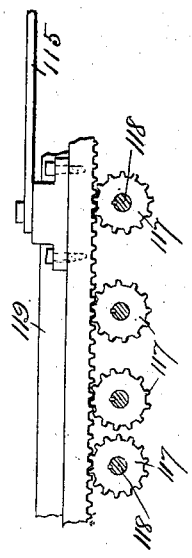
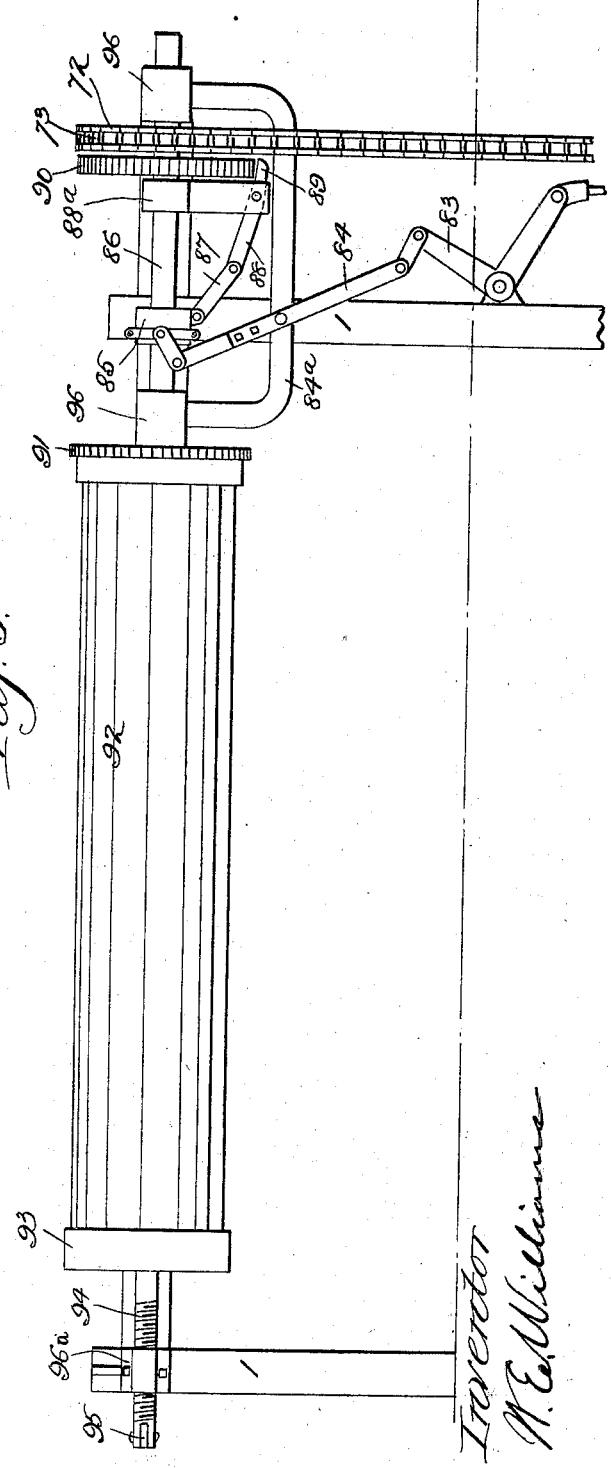

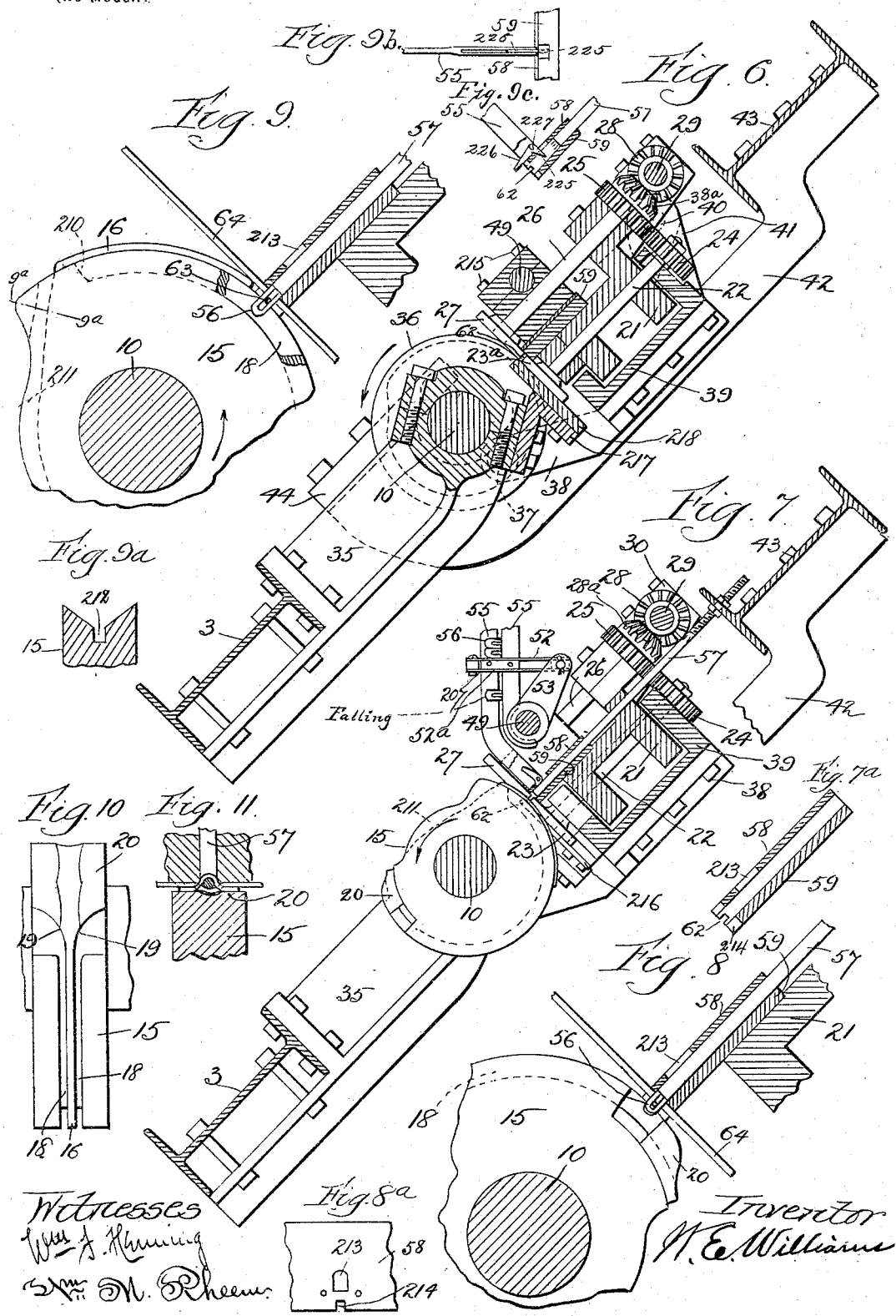

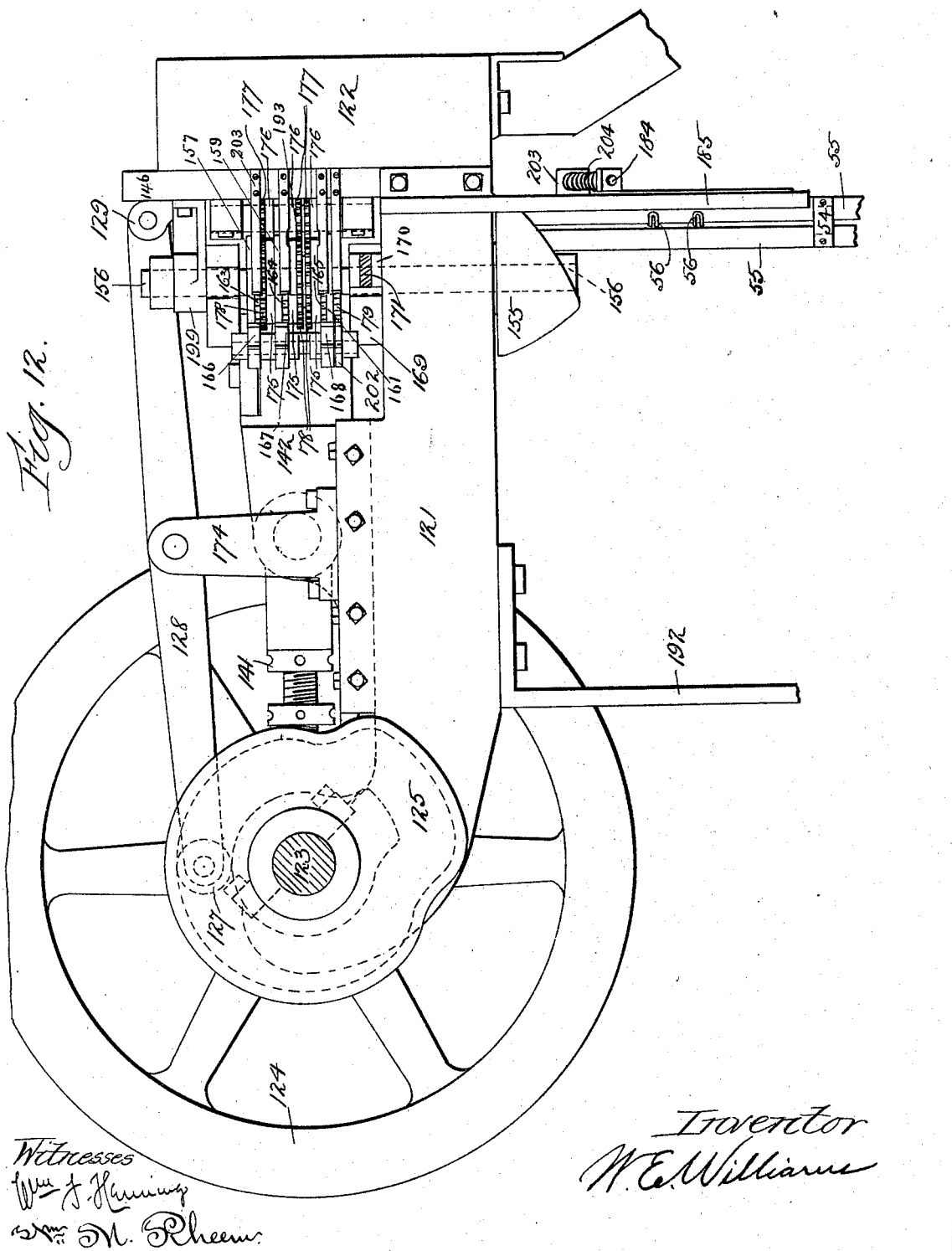

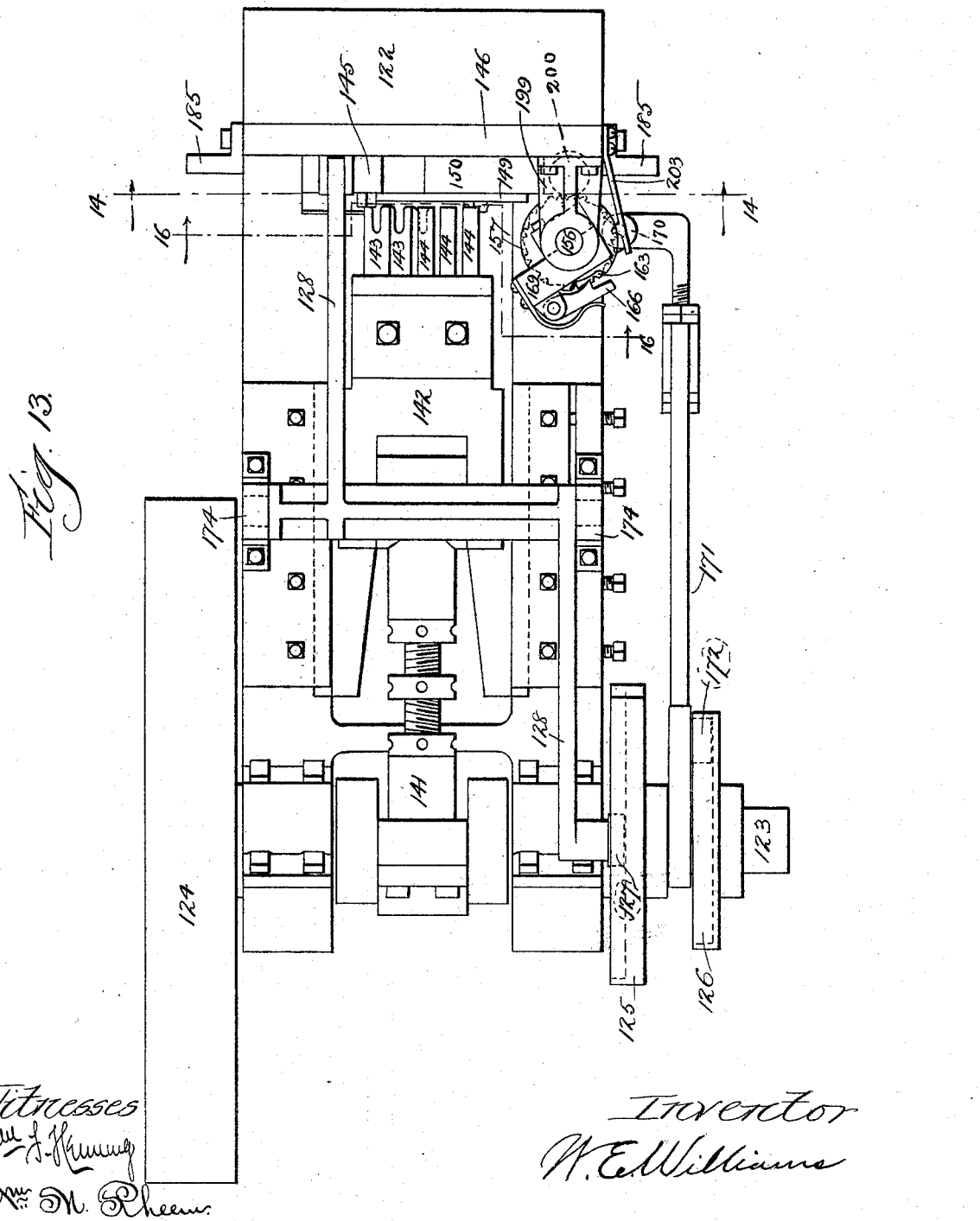

No. 610,216. Patented Sept. 6, 1898.
W. E. WILLIAMS.
WIRE FENCE MACHINE.
(Application filed Dec. 5, 1896.)
(No Model.) 12 Sheets—Sheet 9.

Witnesses
Inventor
W. E. Williams

No. 610,216. Patented Sept. 6, 1898.
W. E. WILLIAMS.
WIRE FENCE MACHINE.
(Application filed Dec. 5, 1896.)
(No Model.) 12 Sheets—Sheet 10.
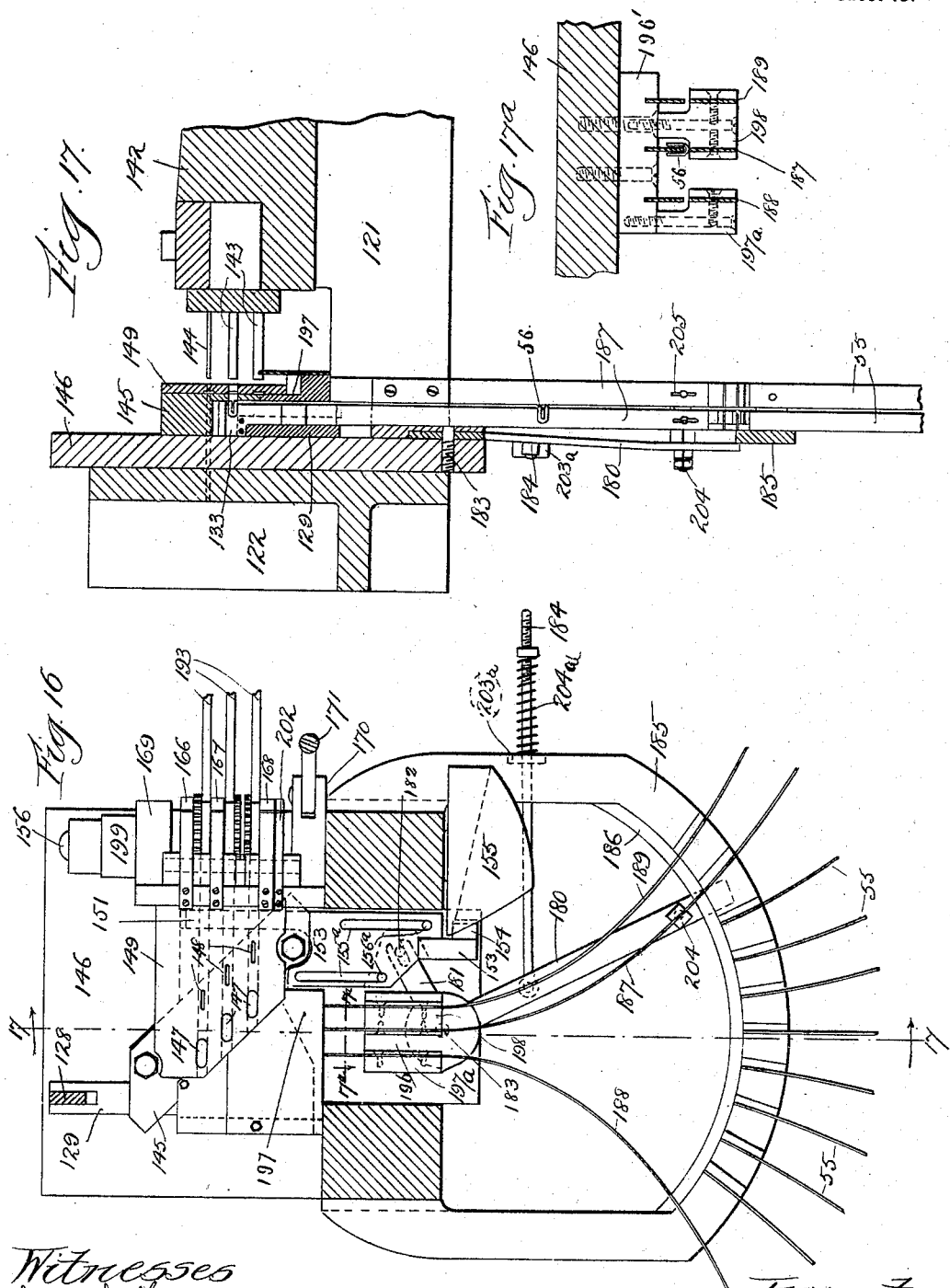

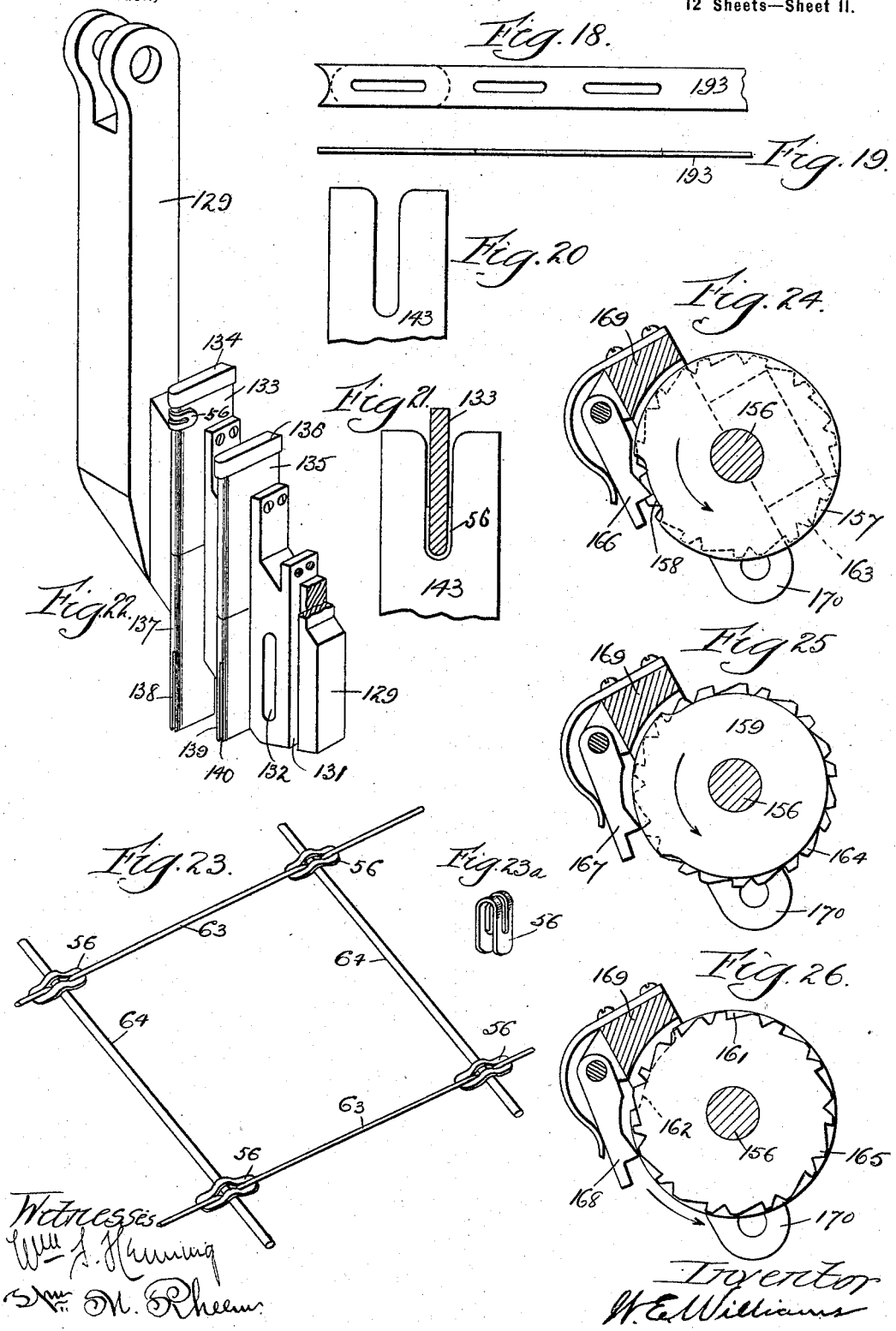

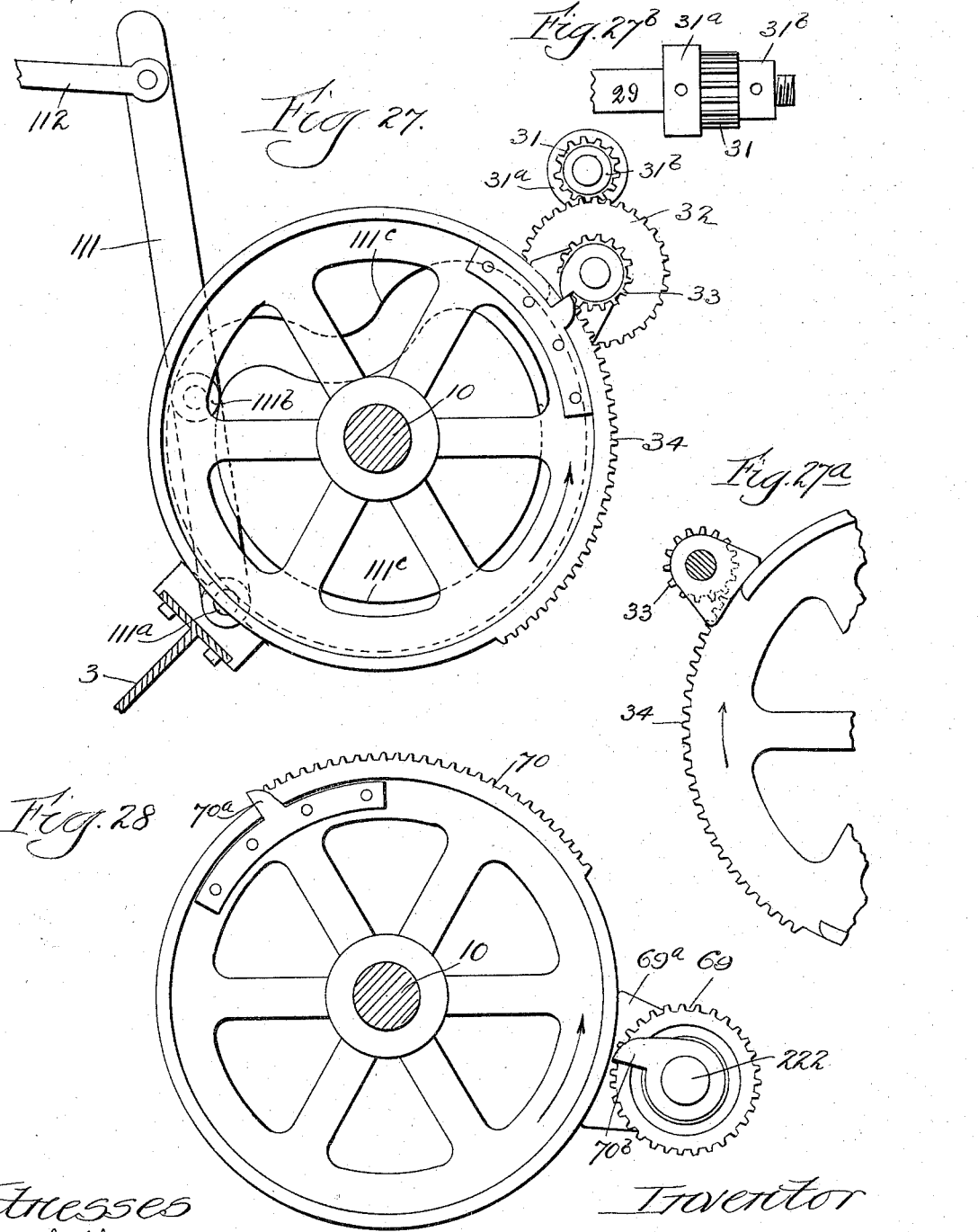

UNITED STATES PATENT OFFICE.

WILLIAM ERASTUS WILLIAMS, OF CHICAGO, ILLINOIS, ASSIGNOR TO C. E. ROBINSON, OF SAME PLACE.

WIRE-FENCE MACHINE.

SPECIFICATION forming part of Letters Patent No. 610,216, dated September 6, 1898.

Application filed December 5, 1896. Serial No. 614,565. (No model.)

*To all whom it may concern:*

Be it known that I, WILLIAM ERASTUS WILLIAMS, a citizen of the United States, residing at Chicago, in the county of Cook and State of Illinois, have invented a new and useful Improvement in Wire-Fence Machines, of which the following is a specification.

My invention relates to that class of wire-fence machines which make a complete woven-wire fabric ready to be fastened to the posts in a body, and the fence is woven with a square mesh, and the union of the woof-wires with the warp-wires is made with the aid of a clip formed by the machine out of a continuous metal strip; and the object of my invention is to produce a machine that will make the herein-described fence or a fence of its class in the most expeditious and best manner possible; and the invention consists in the devices set forth in the claims hereof.

The machine is designed to manipulate as many warp-wires as there are horizontal strand-wires in the fence, and to automatically weave across the warp-wires the woof-wires, and to automatically make from continuous strips clips of suitable form, and to feed them into position on the warp-wires, and thread through these clips so held in position the woof-wire, and then swage out in locking form the clips and woof-wire on the warp-wires, and then to twist into the warp-wires a sinuosity or coiled-spring form for the purpose of giving a spring-tension to the fence when strung upon the posts, and then to automatically wind in a bundle the finished fence.

Reference will be had to the accompanying drawings, in which—

Figure 14:
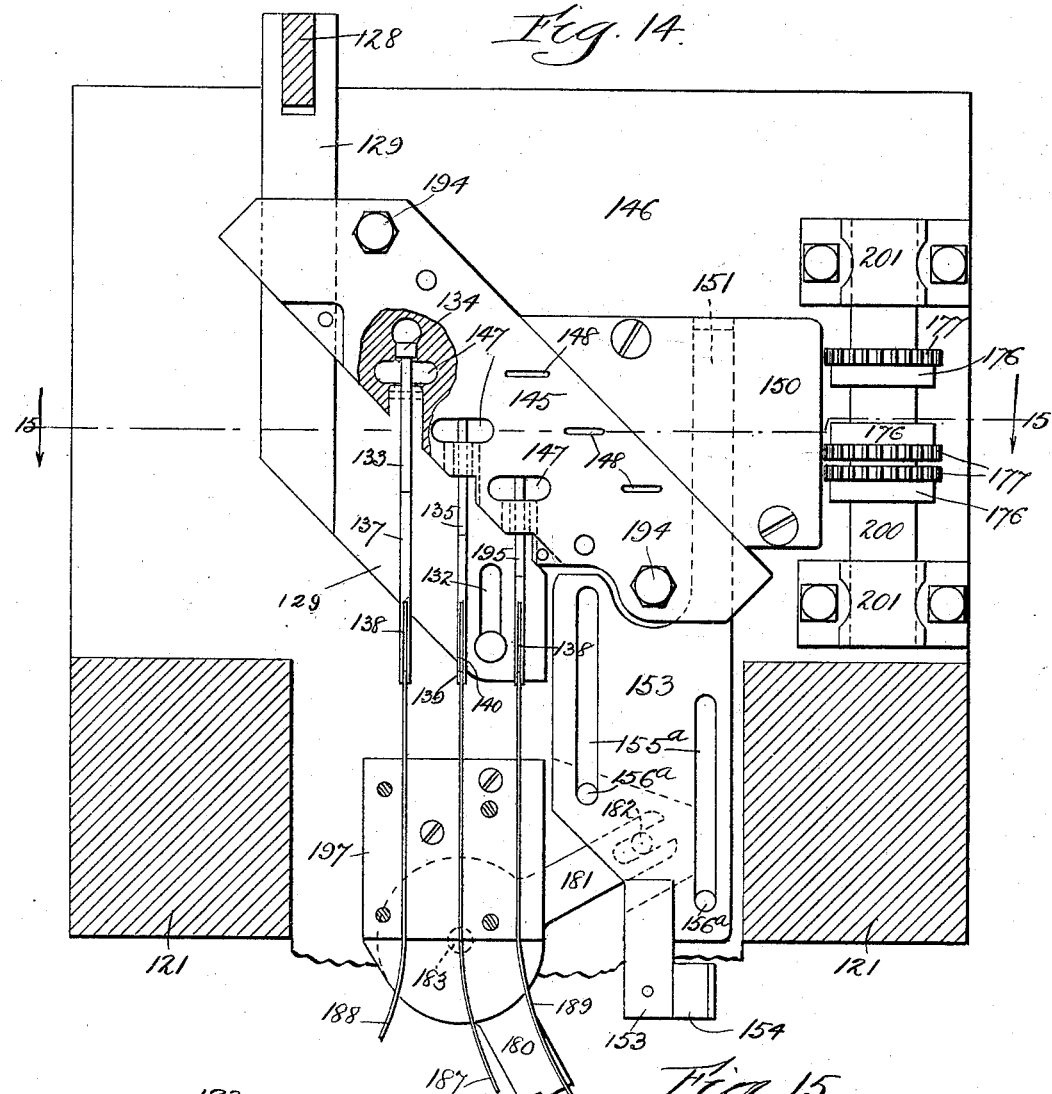
Figure 15:
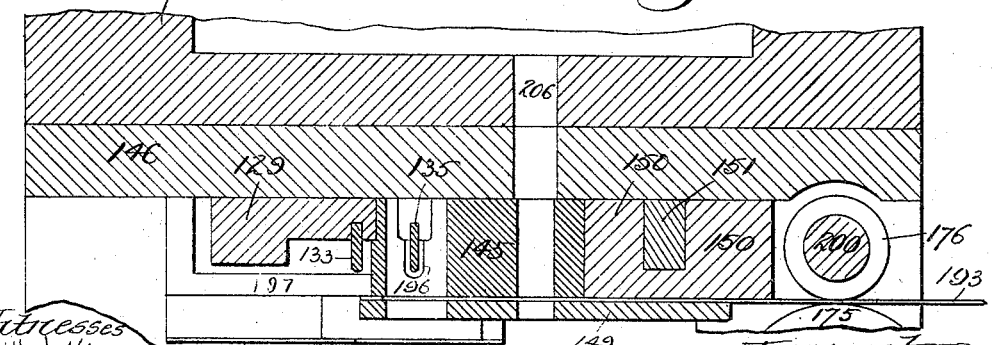

Figure 1 is a side vertical view of the entire machine from the left-hand side, or the side from which the woof-wire is reeled off to the threading mechanism. Fig. 2 is a side sectional view on line 2 2, Fig. 3. Fig. $2^a$, Sheet 2, shows the manner of putting the sinuosity in the warp-wires. Fig. $2^b$ shows the manner of fastening the warp-wire at the top wire of the fence. Fig. $2^c$ shows the mechanism for bending over the end of the woof-wire in position just at the moment of the commencement of the bending. This view is looking in the direction similar to the view shown in Fig. 4 of the corresponding pieces. Fig. $2^d$ shows the mechanism in the act of bending over the end of the woof-wire and the top wire of the fence and cutting off the surplus of the woof-wire. Fig. 3 is a plan view of the front end of the machine. Fig. 4 is a view on the line 4 4 of Fig. 1 of the left-hand side of the machine, a few of the parts being removed for clearness of view. Fig. $4^a$ is a side view of one of the devices for putting slack in the woof-wire. Fig. 5 is a plan view of the winding-drum for taking up the finished fence and the mechanism for operating the same. Fig. $5^a$ is a view of the rack and pinion which actuates the coilers in putting in the sinuosity of the warp-wires. Fig. 6 is a transverse sectional view on line 6 6 of Fig. 3, looking from the right-hand side of the machine, showing the mechanism for feeding the woof-wire. Fig. 7 is a similar view to that of Fig. 6 on line 7 7 of Fig. 3. Fig. $7^a$ is an enlarged section of the bar 59 and plate 58. Fig. 8 is a similar view to that of Figs. 5 and 6, but showing only the clip in position, with the woof-wire threaded and at the point just prior to swaging out the clip. Fig. $8^a$ is a front view of the plate 58. Fig. 9 is a view from the right-hand side, a similar view to that of Fig. 8, showing the clip in position at the time of the threading of the woof-wire. Fig. $9^a$ is a section on the line $9^a$ of Fig. 9. Fig. $9^b$ is a view looking from the top of one of the chutes 55. Fig. $9^c$ is a side view of devices seen in Fig. $9^b$. Fig. 10 is an edge view showing the anvil-block for swaging out the clip. Fig. 11 is a sectional view showing the position of the woof-wire, warp-wire, and clip at the moment of the completion of the swaging. Fig. 12 is an enlarged side view of the press for making the clip. Fig. 13 is a plan view of Fig. 12. Fig. 14 is an enlarged vertical sectional view on line 14 14 of Fig. 13. Fig. 15 is a sectional view on line 15 15 of Fig. 14. Fig. 16 is a transverse vertical view on line 16 16 of Fig. 13. Fig. 17 is a transverse view on line 17 17 of Fig. 16. Fig. $17^a$ is a section on line $17^a$ of Fig. 16. Fig. 18 is a plan view of the strip out of which the clips are made, showing the method of punching the same. Fig. 19 is an edge view of Fig. 18. Fig. 20 shows the end of one of the punches which form the clips. Fig. 21 shows the punch down upon the mandrel, with the clip interposed between. Fig. 22 is a perspective view of the block called the "ejector-block," which holds the mandrels on which the clips are bent and ejects them from the machine. Fig. 23 is a perspective view of one mesh of the fence. Fig. 24 shows the rack-and-cam mechanism for feeding one of the flat strips out of which the clips are made. Fig. 25 shows the mechanism for feeding the middle strip out of which the clips are made. Fig. 26 shows the mechanism for feeding the top strip. Fig. 27 shows the intermittent gearing for driving the feed-rolls of the woof-wires. Fig. 27$^a$ shows that side of the wheel 34 not seen in Fig. 27. Fig. 27$^b$ shows means for adjustably fastening gear 31 to shaft 29, and Fig. 28 shows the intermittent gearing for driving the feed-rolls of the warp-wires.

My invention consists in the combination, in an automatic machine, of the following parts or elements: a device, means, or mechanism for forming the U-shaped clips; a device, means, or mechanism for delivering the clips from the clip-forming mechanism into a series of chutes or guides for the clips; a series of clip-feed devices, means, or mechanisms, one for each clip chute or guide; devices, means, or mechanism for holding a series of clips in line with each other in position to be threaded by the woof-wire; devices, means, or mechanism for holding or supporting a series of warp-wires in proper position relative to the clips and woof-wire; devices, means, or mechanism for assembling or moving the series of clips and warp-wires into proper relative position in respect to each other; a two-part opening and closing guide for directing the woof-wire through the series of clips when assembled with the series of warp-wires; a device, means, or mechanism for feeding the woof-wire forward at intervals; a device, means, or mechanism for feeding the warp-wires forward at intervals; a device, means, or mechanism for setting or compressing or swaging the series of clips to fix them rigidly in position at the crossings of the woof and warp wires; a device, means, or mechanism for cutting the woof-wire into lengths; a device, means, or mechanism for cutting the surplus stock from the free end of the woof-wire after it is fed; a device, means, or mechanism for bending the end of the woof-wire about the marginal clip of the fabric; devices, means, or mechanisms for forming curves or sinuosities in the warp-wires, and a device, means, or mechanism for reeling or taking up the finished fabric.

My invention further consists in the various novel combinations of any two or more of said parts or elements, as hereinafter specified in the claims, and in such combinations any suitable construction of each of the elements or parts may be employed which will perform the required function and coöperate with the other elements.

It further consists in the novel construction of certain of said parts or elements, as herein shown and described, and specified in the claims.

The frame of the machine may be of any suitable form or construction adapted to support the various parts or elements of the machine in their proper relative positions and the driving or connecting mechanism by which their appropriate movements are communicated to the several moving parts of the machine.

The device, means, or mechanism for forming the clips may be of any suitable construction adapted to cut and stamp the clips to the required U shape and form the slot or opening therein through which the warp-wires are fed. It, however, preferably consists of two pairs of dies or punches mounted in a suitable press, one pair 144 148 for punching out the central hole or slot in the clip and another pair or set 143 147 133 for cutting off the clip and bending it to the required U form.

The device, means, or mechanism for delivering the clips from the clip-forming device in proper position to enter the clip chute or guide may be of any suitable kind or construction capable of performing this function. It, however, preferably consists in a clip way or passage formed on the clip-forming mandrel or block, operating in conjunction with a clip-ejector 134.

To adapt the clip-forming device, press, or mechanism to form clips for two or more of the clip-feed chutes and thus save the expense of unnecessary duplication of the clip-forming mechanism, I insert a clip-switching device or mechanism between the clip-forming device and the clip-feed chutes or guides. This intermediate clip-switching device or mechanism may be of any suitable kind or construction adapted to successively direct the clips to the several clip-feed chutes intended to be supplied with clips from the same clip-forming mechanism. The clip-switching mechanism which I prefer to employ consists, essentially, of a series of pivoted or movable clip-guide rails 187, which in turn may be brought into registry with each of the clip-feed passages or ways 55 and thus connect the same with the clip-forming device.

The series of clip chutes, guides, or feed-passages may each be of any suitable construction adapted to guide or convey the clips in the required position. They may each, however, preferably consist of a pair of guide-bars 55, astride of one of which the U-shaped clip fits and slides, while the other holds it in position thereon.

The means, mechanism, or device 52 for feeding the clips one by one from the clip chute or guide 55 may be of any suitable construction adapted to perform this function. This clip-feed mechanism or device, however, I prefer to construct substantially as illustrated in the drawings—that is to say, of four strips of metal held together by blocks and which are moved at intervals to open and close the clip-feed chute or guide, the space between the contiguous plates or strips of metal being equal to the width of the clip, so that only one clip can enter between each pair of strips or plates at a time.

The device, means, or mechanism for holding the series of clips in line with each other in position to be threaded by the woof-wire may be of any suitable kind or construction adapted to perform this function and to coöperate with the other parts. The device, means, or mechanism, however, which I prefer to employ for holding each clip in line with the others consists, essentially, of a clip-receiving recess formed in a bar 59, a curved rib or cam 16, astride which the clip may fit, and a punch 57, adapted to engage the back of the U-shaped clip and hold it firmly in position astride of the warp-wire.

The device, means, or mechanism for holding or supporting the series of warp-wires in proper position relative to the clips and woof-wire may be of any suitable construction adapted to perform this function. This device, however, may preferably consist for each warp-wire of a warp-wire guide, notch, or recess 214, formed in bar 59 and in a plate 58, which fits on the opposite edge of the clip from the bar 59. The guide-roll 110 for the finished and the warp-wire-feed rolls or devices may also aid in holding the series of warp-wires in proper position.

The device, means, or mechanism for assembling or moving the series of clips and warp-wires into proper relative position with the clips astride the warp-wires may be of any suitable kind or construction adapted to perform this function and may operate either by guiding or moving the clips into position astride the warp-wires, or the warp-wires into a position between the limbs of the clips, or by moving both clips and warp-wires toward each other. The device, means, or mechanism which I prefer to employ for performing this function and which I have illustrated in the drawings operates by moving both the clip toward the warp-wire and the warp-wire toward the clip, as I am in this way enabled to utilize the punch, which constitutes part of the clip-holding mechanism, for also moving the clips forward or toward the warp-wire, and by making the curved rib 16, astride which the clip fits, segmental or cam-shaped at its end I am enabled to cause its end or cam-shaped portion to engage the warp-wire and move it toward the clip and into position where the clip is astride the warp-wire. By this particular construction of the clip-holding device and the device for assembling the clip and warp-wire together I am enabled to materially simplify the construction and operation of the machine, although, as before stated, any suitable construction of device may be employed for performing these functions.

The guide or device 62 216 for guiding or directing the woof-wire to the openings in the clips when the series of clips are in position astride the series of warp-wires may be of any suitable kind or construction adapted to perform this function and at the same time release the warp-wire and permit the fabric to feed forward at right angles to the guide after the woof-wire has been threaded through the clips. As illustrated in the drawings, this woof-wire guide consists, essentially, of a groove or channel 62, formed in the bar 59, and a movable or opening and closing part 216, coöperating therewith, which when closed completes the guide and which when open permits the woof-wire to move or be moved laterally out of the guide.

The device, means, or mechanism for feeding the woof-wire forward at intervals as required may be of any suitable kind or construction adapted to perform this function. It may preferably consist of an ordinary pair of wire-feed rolls 23 27.

In cases where the woof-wire is made of comparatively small or flexible wire it is desirable to feed the woof-wire at different points of its length between the outer edges of the fabric, and I may therefore provide additional feed-rolls or feed devices between certain of the warp-wires, the woof-wire guide being cut away to permit proper engagement of the supplemental warp-wire-feed devices where required.

The device, means, or mechanism for feeding the series of warp-wires may preferably consist for each warp-wire of a pair of ordinary wire-feed rolls 65 67, but may be of any suitable construction.

The device, means, or mechanism for bending, swaging, crimping, or setting the series of U-shaped clips, so as to cause them to rigidly clamp and embrace the warp-wires and woof-wire at each crossing, may be of any suitable kind or construction adapted to perform this function. The particular construction, however, for this device which I prefer to employ consists, essentially, of wedging or cam-shaped surfaces 19 19 on the curved rib 16, and which in the rotary movement of said cam or curved rib engages the two limbs of the U-shaped clip and spreads them apart, the cam 19 19 operating in conjunction with the punch 57 and with the lower or inner side of the bars 59 and 58.

The device, means, or mechanism for cutting off the warp-wire may be of any suitable construction, but consists, essentially, of a pair of knives or cutters 60 218, one of which at least is movable in respect to the other.

The device, means, or mechanism for cutting the surplus stock from the free end of the woof-wire also consists, preferably, of a pair of knives or cutters 107 20.

The device, means, or mechanism for bending the end of the woof-wire about the marginal clip may be of any suitable kind or construction. It, however, preferably consists of a bending or folding device 108 107.

The device, means, or mechanism for forming curves or sinuosities in the warp-wires between the several woof-wires may be of any suitable kind or construction adapted to perform this function. It may, however, preferably consist for each warp-wire of a rotating mandrel 118, which operates to bend the warp-wire by engaging the same.

The device, means, or mechanism for taking up the finished fabric may be of any ordinary construction of drum or reel adapted to perform this function in the combination.

Any suitable connecting mechanism, gearing, or motion-giving devices may be employed for imparting to each of the several operative moving parts or elements of the machine their required motions or movements.

For convenience I will describe separately the parts which perform the several different functions in connection with the gearing or connecting mechanism which I prefer to employ for giving the required movements to each of the moving parts, and will begin with the framework. The frame of the machine is made of the two side beams 1, of structural I-beam section, upon which there are fastened two short beams 2 at an angle of forty-five degrees, and across the machine, underneath these inclined beams 2, there is an I-beam 3. The inclined beams 2 are stiffened by braces 4 at the front end of the machine. At the rear end of the machine there is a cross I-beam 8, and the whole framework rests on the blocks 9, resting on the floor. Fastened to the I-beams 2 there are two cast-iron posts 6, one on each side of the machine, connected together at the top by the I-beam 7 and supported by angle-iron braces 5. The I-beams 3 and 7 extend across the machine beyond the side I-beams 1 and support the drive-pulley 14 on the end of the main driving-shaft. Fastened on the I-beams 2 are two inclined posts 190, supporting a cross-beam 191, on which rests the end of the press-frame 122. The other end of the press-frame and the main limbs thereof, 121, are supported by posts 192, which are fastened to and supported by the I-beam 7. Thus we have a substantial frame made entirely of iron.

I will next describe the press which makes the clips, in connection with the gearing or mechanism for operating the same, for fastening the woof-wires to the warp-wires. A perspective view of one of these clips is shown in Fig. 23ª. The press for making these clips is the ordinary stamping-press and is here shown lying on its back supported by the framework, as above described, and the framework of this press is composed of the main limbs 121 and the base-piece 122, on which is fastened the bolster 146, on which bolster are fastened the dies and mechanism for making the clips. The main shaft of the press is designated by 123 and is driven by a belted fly-wheel 124 and carries the cams 125 and 126. In Fig. 12 cam 126 and the cam-arm 171 are removed for clearness of illustration. The cross-head 142 of the press carries two sets of punches, one set for punching out the center hole in the clip and the other set for cutting off the ends of the clips and for bending them to the proper form.

The fence which is proposed to be constructed by this machine is composed of three sizes of warp-wires, the top wire being the largest, the bottom wire next largest, and the intermediate wires the smallest of the warp-wires, there being eleven wires in all. It is therefore necessary to make clips the proper size for each size wire; so the dies of the press are made with three sets, one for the top wire, one for the intermediate wires, and one for the bottom wires; so the press is designed to automatically feed three continuous strips of flat metal, as is shown by Figs. 18 and 19, and form clips of each strip, and the feeding mechanism of the press is so arranged that it will feed the strips forming the clip for the top wire once and the strip for forming the clip for the intermediate wires nine times and the strip for forming the bottom-wire clip once, and a switching mechanism is provided to switch the clips from the intermediate die into nine different chutes, whereby the one die will make clips for the nine different warp-wires. The press is designed to make but one clip at each stroke, and by the arrangement of the feeding mechanism and the switching mechanism it makes the requisite number of each size clips to keep the balance of the machine properly supplied with clips; so there are provided dies of three different sizes; but one clip only is made at each stroke of the press, and it is designed to run the press fast enough to supply clips for the balance of the machine.

Fastened to the bolster-plate 146 by screws 194, Fig. 14, is a die-block 145, which is of peculiar shape and is provided with a set of holes 148 for punching out the central portion of the clip and a set of holes 147 for cutting off the clip from the strips and cutting off the ends of the clip. A short way down below the cutting-surface of the die-block, at the holes 147, there are some apertures at the side of the die, into which extend the mandrels 123, 135, and 195, (see Figs. 14, 15, 16, 17, and 22,) which mandrels are provided with a head 134 and are fastened into the block 129, which block 129 is of peculiar shape and has slots across its lower end in a manner to secure and hold the hard-steel mandrels. One of these slots is shown by 131, Fig. 22. This block is vibrated up and down, carrying the mandrels in and out of the die at right angles to the direction of the action of the punches by means of a lever 128, pivoted in blocks 174, fastened to the press, and is actuated by cam-roller 127, actuated by cam 125 on the main shaft of the press. The strips 193 are punched for the center holes of the clips two holes in advance of the bending, and when they arrive at the hole 147 of the dies the punches 143 cut off the clip from the main strip and cut off the other end of the clip in the form shown by the dotted lines in Fig. 18, and the further movement of the punch downward forces the clip down over the mandrel 133, (see Fig. 21,) and when the punch is in the position of Fig. 21 the block 129 is moved by its cam downward, carrying with it all the mandrels, and the shoulder on the head of the mandrels 134 and 136, Fig. 22, being of the size of the aperture in the punch correspondingly larger than the mandrel as the metal of the clip is in thickness, whereupon at the lowest position of the punch during the passing of the dead-center of the crank of the press the clip is carried out bodily sidewise from the embrace of the punch and is carried out through an aperture in the side of the die provided therefor. This aperture in the die side is shown by 196, Fig. 15, whereupon as the clip becomes freed from the die it slides down a continuation of the mandrel, being the blocks 137, which are slotted at their lower ends, as is shown by 138 and 140, into which slide pieces of thin steel 187, 188, and 189, which are the ends of the switch-rails for the clips. These switch-rails are in two sets. The lower set, that which is shown in Fig. 14, is held in slots in a block 196', Fig. 17ª, fastened to the bolster-plate by screws. The purpose of the slots 138 and 140 in the ends of the mandrel-pieces is to permit the vertical movement of the mandrels with the block 129 in ejecting the clips from the die. Fastened to the bolster-plate and fitted to the lower edge of the die-plate is a plate 197, Fig. 17, the under side of which is fitted in a manner to leave sufficient clearance at the top of the mandrels to permit the clips to slide down on the mandrels, but not to become displaced therefrom. This block is shown in Figs. 16 and 17. The steel blades forming the top portion of the switch-rails are fastened to the blocks 197 and 198, (see Figs. 16, 17, and 17ª,) and the clip slides down between those steel blades to the main chutes 55, which main chutes 55 are connected in a segment 185. The two outer switch-rails 188 and 189 (see Fig. 16) are connected continuously with their corresponding chutes 55, which extend to the top and bottom wires, respectively, and hence no switching of the clips is required for these chutes; but the intermediate chutes must be supplied by the center punch and center switch-rail 187. Hence means are provided at each action of the press to switch the rail 187, Fig. 16. This switching mechanism is operated by and connected to the feeding mechanism, which feeds in the continuous strips of metal 193 out of which the clips are formed.

I will now describe the feeding mechanism for feeding the several strips intermittently, as before described.

Extending vertically through one of the limbs of the press and at the side thereof there is a shaft 156, which shaft is supported at its upper end by a box 199, and the other end is supported where it passes through the limb of the press. On this shaft there are fastened securely three cams 157, 159, and 161 and a ratchet 179 and a cam 155. There are also loosely mounted upon the shaft three feed-rolls 175, all of the same diameter. Fixed to each feed-roll and revolving therewith is a ratchet and a gear-wheel. The gears are shown by 178 and the ratchets by 163, 164, and 165. These gears and feed-rolls are fastened together in three sets, a gear, ratchet, and a feed-roll together, revolving loosely on the shaft 156. Supported alongside the shaft 156 is a shaft 200, held in box 201, Fig. 14, upon which revolve loosely three small feed-rolls 176, each coacting with the feed-rolls 175. Fastened to each feed-roll 176 is a gear 177, which is engaged and driven by the gear of the corresponding feed-roll on shaft 156. Mounted on shaft 156 in a manner to vibrate slightly there is a pawl-arm 169, having the projection 170, which is engaged by the arm 171, which is actuated in the vibratory movement by cam-roller 172, actuated by the cam 126 on shaft 123 of press. The end of this arm 171 is made adjustable by the nuts, as is readily seen by the drawings, Fig. 1. The purpose of this arm 171 is to vibrate the pawl-arm 169 at every revolution of the press a sufficient distance to move the pawls 166, 167, 168, and 202 a space sufficient to feed the strips 193 the required distance for one clip. The four ratchets shown in the drawings are provided with two sets of teeth, one set having a V-shaped opening and the other one a square shoulder parallel with the radius. The purpose of the square-shouldered teeth is to be engaged by the feed-pawls 166, 167, 168, and 202, while that of the other set is for a detention-pawl, or the pawls that hold the ratchets at rest upon the return of the feed-pawls. These pawl are all alike and are shown as 203 in Fig. 13. Their only purpose is to hold the ratchets from backward movement and hold them in exact position when carried to their limit of motion by the other pawls. Thus it will be seen that the arm 169 is vibrated at every revolution of the press and that it carries four actuating-pawls—namely, 166, 167, 168, and 202. The pawl 202 engages the ratchet 179, which is fixed to the shaft 156, and hence at every vibration of the pawl 202 the shaft 156 is made to move forward one space, and hence it carries with it cams 157, 159, and 161. Cams 157 and 161 are slightly larger than the outside diameter of the ratchets adjacent to them, and since the pawls 166 and 168 are as wide as both the ratchet and the cam-surface the pawls are kept from engaging the ratchet at all points save where the cams are cut away, permitting the pawl to fall down into engagement with the ratchet. The cams 157 and 161 are cut away at points 162 and 158 a sufficient length only on the periphery to permit the pawls to engage the ratchet during the period of one vibration only, (see Figs. 24, 25, and 26,) while cam 159 is cut away throughout its entire periphery save at a point equaling the length of two spaces on the ratchet corresponding to the spaces which are cut away in the other two cams, whereby pawl 167 is permitted to engage the ratchet 164 at all its teeth save two only, and the spacing of the cams 161, 157, and 159 is such that but one of the three pawls can engage a ratchet at a time, and as there are eleven teeth in the ratchets to be engaged by the pawls there will be one actuation of each of the top and bottom strips 193 to nine of the middle strips. Thus it will be seen but one clip is made at a time, and the top and bottom and intermediate clips are made as is required by the use of the machine. The punches 143 and 144 entering the die-holes 147 and 148 run idle during such time that there is no strip being fed in their respective spaces.

Since shaft 156 revolves every time one space, as above described, the cam 155 on the lower end of the shaft (see Figs. 12 and 16) will revolve one space at each stroke of the press, and in contact with this cam there is a cam-roller 154, carried by an arm 153, which arm is of peculiar shape and is provided with a projection 151, extending upward under the die-block, for the purpose of steadying its movement and is held to travel vertically by means of the screws 156$^a$ in slots 155$^a$, screwed into the bolster-plate. In the lower side of this block 153 there is a recess (shown by the dotted lines in Fig. 14) into which extends the arm 181 of the switch-bar 180, which switch-bar is pivoted at 183 underneath the block 196. The arm 181 is slotted to embrace a stud 182 in the block 153, whereby the vertical movement of the block 153 through its cam-roller 154, driven by a cam 155, the arm 180 is made to travel backward and forward through a sufficient angle to cover the intermediate chutes 55. (See Fig. 16.) The cam-surface of the cam 155 is such that the roller is forced downward through nine different spaces in the circumference of the cam, and the roller returns back to its normal position in two spaces. The purpose of this is that during nine revolutions of the press nine intermediate clips are made, which travel down the middle switch-rail and are distributed into the intermediate chutes 55, while during the other two revolutions of the press, thus completing the revolution of the cam 155, the top and bottom clips are made, each traveling down the outside switch-rails, which are fixed. Thus the arm is given the opportunity to return to its normal position during the period of time that the press is making the top and bottom clips. The action of the cam 155 is positive in but one direction. Hence to cause the block 153 to return to its normal position I provide the rod 184, pivoted to the arm 180, and slide it through the bracket 203 in the side of the segment 185, and on this rod I put a compression-spring 204$^a$, Fig. 16, which not only returns the block 153 to its normal position, but at all times takes up the slack in the switch mechanism, permitting the close adjustment of the end of the switch-rails with the chutes at all times. On the end of the arm 180 there is pivoted a block 204, which is connected by means of slots 205, Fig. 17, to the spring-steel switch-rails 187. Thus by the swinging of the arm 180 the switch-rails 187 bend to the proper curve line suitable to carry the clip in the best manner directly into the ends of the chutes 55. In the segment 185 there is an offset 186, into which the ends of the switch-rails 187 slide, and the end of the arm 180 embracing the other side of the segment 185 insures at all times the proper position of the switch-rails in relation to the segment 185.

On the top of the die-plate 145 there is a stripper-block 149, which is provided with grooves (shown by the dotted line, Fig. 16) on its under surface, into which the strips 193 pass to the dies. A block 150, Fig. 14, is screwed to the bolster-plate to fill up on a level with the die the space between the feed-rolls 176 and the die-block 145. The end of the block 153 passes through the slot on the under side of this block 150. The chips from the punching of the die-holes 148 pass through holes 206, Fig. 15, in the back piece of the press 122.

Having now described the mechanism for manufacturing the clips and depositing them in the several different chutes, I will now describe the mechanism for feeding the clips in place to be threaded by the woof-wires in connection with the gearing or connecting mechanism for operating the same and other parts.

The clips travel down the chutes 55, which are made of two bars spaced apart a sufficient distance to equal the thickness of the clip and are held together by blocks 54. The clip runs down astride one of the bars of the chute, as is shown by 56 in Figs. 1, 2, 7, 12, and 17, and the press is supposed to make a sufficient quantity of these clips in advance that at all times there will be quite a quantity of them in the chute 55 above the clip-feeding device 52. (See Figs. 4 and 7.) This feeding device is composed of four thin strips of metal held together by blocks at each end and placed over the bars, forming the chutes 55, and they ride upon a block 207, which is fastened to the bars 55. The top metal strips 52 are cut away at the top side to permit a clip out of the chute to fall down in between them and rest upon the lower bars, the space between the bars 52 and 52$^a$ being just equal to the width of the clip, 52$^a$ being the lower bars. Pivoted to the block which separates the bars 52 and 52$^a$ is an arm 53, carried on a shaft 49, extending across the machine, and actuated by an arm 50, Fig. 3, carrying a roller engaging a cam 51 on the main shaft of the machine. Thus at the proper interval the arm 53 is made to move forward from the position shown in Fig. 7, equaling the blank space between the bars 55 and the block at the end of the bar 52, which moves the opening 208 and the top bars 52 beyond the point in which the clips can fall down in between the bars 52 and 52ª, and at the same time it brings open to the clip which is engaged by bars 52 and 52ª another set of openings in the bars 52ª, which permits the engaged clip to fall down into the machine, and on the return movement of the arm 53 the opening 208 in the bars 52 is again brought open to the clips in the chutes, whereupon they fall down into the feeding device and deposit one clip. Thus at each movement of the arm 53 forward and back one clip is permitted to fall from the stock in the chute above.

I will now proceed to describe the mechanism for threading the woof-wire and for swaging out the clips upon the woof-wire into engagement with the warp-wire in connection with the gearing or connecting mechanism for operating the same and other parts.

Across the machine extends the main driving-shaft 10, upon which there are eleven cams 15, all similar in construction to each other. These cams serve the purpose of lifting the warp-wires up into the recesses, whereat the clips are placed over them and the woof-wire is threaded through, and they also serve as an anvil-block, whereon the clip is swaged out to the proper form after the woof-wire is threaded through. These cams 15 are of a peculiar construction, being provided with a steel rib 16, Figs. 9 and 10, which extends beyond the outer surface of the cam a varying distance on the circumference of each cam, that distance being shortest for the cam where the woof-wire starts to travel across the warp-wires and longest at the end of travel of the woof-wire and varying intermediately between those cams. On each side of this steel rib there are slots 18, Fig. 10, which extend from the anvil-block 20 around to a point 210, Fig. 9. The purpose of these slots on the side of the steel rib is to permit the ends of the clip to extend down into the slots astride of the warp-wire 64 and the rib 16. A portion of the cam is cut away at 211, Figs. 7 and 9, to permit the feeding forward of the warp-wire after the woof-wire is first threaded. This portion 211 which is cut away gives clearance below the threading-bar for the wires to readily feed forward. In cams 15 there is a V-shaped slot 212, a cross-section of which is shown in Fig. 9ª and a front view of which is seen in Fig. 4. The purpose of this slot is to engage the warp-wire and force it up into the notch in the threading-bar, where the clip is placed upon it, and the manner of this lifting will be apparent by observing Fig. 9 and noticing the effect of the revolution of the cam 15.

Extending across the machine between the posts 6 and fastened thereto is a cast-iron I-beam section 21 of peculiar shape. This beam supports what I call the "threading-bar."

The threading-bar is designated by 59 and is a flat bar of steel bolted onto the seat in the beam 21 and extending a little beyond the entire length of travel of the woof-wire. This bar 59 has a series of slots cut down the front face of it, into which are fitted a set of punches 57, and on the front face of the bar 59 there is bolted a flat plate of steel 58, which covers the entire surface of the bar 59 and therefore engages the top sides of the punches, making a square hole for the travel of the punches 57. In the front face of this plate 58, opposite the slots in which the punches slide, there is a set of holes or apertures 213, (see Fig. 4,) into which the clips are entered into the slots in which the punches 57 travel. This hole is shown in a sectional view, Fig. 8, by the unshaded portion 213. In the bottom of the bar 59 and plate 58 there are some notches or apertures 214, (see Fig. 8ª,) into which the warp-wire is lifted by the rib 16 on the cam 15, and the warp-wires are held in this notch during the period of time that the woof-wire is threaded through. Extending parallel with the beam 21 and on the back side thereof there is a vibrating beam 39, provided with lugs 41, which are pivoted to lugs 40 on beam 21, and on one end of this beam 39 there is an arm 38, (see Figs. 4 and 6,) which carries the cam-roller 37, working in a cam 36 on the main shaft 10 of the machine, the purpose of which cam is to move the lower edge of the beam 39 backward and forward slightly at the proper interval. In the bottom of the bar 59 in line with the center of the punches 57 and extending clear across the length of the bar 59 there is a slot slightly larger than the size of the woof-wire to be threaded. This slot is shown as 62 in Fig. 7ª, which is an end section of the bar, through one of the slots through which the punches 57 travel. Extending into this slot on each side thereof there are recesses in the sides of the bar 59 and plate 58, in which there are four sets of feed-rolls 27 and 23, (see Figs. 3, 4, 6, and 7,) the purpose of which is to feed forward the woof-wire through the slot 62 in the bar 59 and through the clips when in position. These feed-rolls are geared together by gears 24 and 25, and on the shaft 26 of gear 25 there is a bevel-gear 28ª, engaging bevel-gear 28 on the driving-shaft 29, which is carried in boxes 30 on beam 21 and 6, and the shaft 29 is driven intermittently by gear 31, Figs. 3 and 21, driven by a gear 32, driven by a gear 33, driven by a gear 34 on the main shaft 10 of the machine. The first set of feed-rolls being that set on the left-hand side of the machine and shown in Fig. 6 as 27 and 23ª, the roll 23ª is at its lower end supported in an independent box by screws 215, Fig. 4, which pass through the box for the shaft of the roll 27, while for all the other feed-rolls 23 the box supporting the lower end of the shaft of the feed-roll 23 is fastened to the beam 39 and moves in and out with the beam 39. On the bottom of the beam 39 there is bolted a set of plates 216, which extend forward, and when the beam 39 is forward nearest to the beam 21 the ends of the plates 216 just cover the slot 62 in the bottom of the bar 59, and when the beam 39 is withdrawn or drawn back by the cam 36 the plates 216 expose or leave open the entire bottom of the slot 62 in the bar 59, and on the forward movement of the bar 59 it carries with it the rolls 23, which cause them to coöperate with the rolls 27 in a manner to grip and feed the warp-wire as it comes along the slot 62, and when the beam 39 is drawn back the rolls 23 are free from the woof-wire, which permits it to drop or be pushed down out of the slot 62 and permit the feeding forward of the warp-wire or finished fence.

Extending across the machine from posts 6 is a beam 43, (see Figs. 3, 4, 6, and 7,) which beam 43 slides in ways 43$^a$ in the posts 6 and is connected at each end by arms 42, each carrying cam-rollers 45 and 48, which are engaged by cams 46 and 47 on main shaft 10 of the machine. The cams 46 force down the beam and cams 47 force up the beam and are so adjusted with relation to each other as to positively move the beam 43 in the desired direction at all times and hold the beam 43 at rest at two intervals in the revolution of the shaft 10, and this beam 43 carries the punches 57' and the cut-off punch 60, Fig. 4, for cutting off the end of the woof-wire after it is threaded through the clips.

Extending across the machine underneath the shaft 10 there is an I-beam 3, which supports three bearing-boxes 35 of the main shaft 10, the bearing-boxes 35 being on the left-hand side. The one shown in Fig. 6 is provided with a bracket 217, that supports the steel block 218, which acts as a shear-blade, against which the punch 60 coacts in cutting off the woof-wire after threading. The woof-wire is shown as entering into the first set of feed-rolls by the dotted lines 63, Fig. 4, and it is never released from the first set of feed-rolls on that side of the machine.

The clips 56 slide down the chute below the feeding mechanism 52 into the apertures 213 in the plate 58, Figs. 4 and 7, and pass into the slots in the bar 59 in which the punches 57 travel, the punches 57 meanwhile being in the position raised above the top side of the apertures 213, whereupon immediately after the entrance of the clip 56 into the slot in which the punches 57 travel the punches descend and force the clips down over the warp-wires, as is shown in Figs. 8 and 9, in position for the threading through of the woof-wire, whereupon the intermittent gearing which drives the feed-rolls 27 and 23 starts the feed-rolls, the cam 36 having brought the beam 39 into position where the plates 216 cover the bottom of the slot 62 in the bar 59 and also having brought feed-rolls 23 up adjacent to the feed-rolls 27 to engage the woof-wire as it comes along. The cams meanwhile are traveling, and the ribs 16 hold the warp-wires 64 up into the notches 214 in the bar 59, and this rib 16 is designed to be cut away, as is shown in Fig. 9, on each cam just prior to the period of time that the end of the woof-wire travels along, and were it not thus cut away, it being in close engagement with the warp-wire, it would obstruct the travel of the woof-wire across through the clips.

After the woof-wire has passed any clip the warp-wire no longer requires supporting by the rib 16 of the cam 15. During the period of time of the threading of the woof-wire across through the clips the cams which control the movement of the beam 43 hold it, and hence the punches 57, at rest. In fact the beam 43 is at rest during the period of travel of the cams 15 over an angle of one hundred and eighty degrees, and the gearing is so provided that the warp-wire is threaded during the period of travel of the cams of one hundred and fifty-three degrees. This blank space of twenty-seven degrees, being the difference between one hundred and fifty-three degrees and one hundred and eighty degrees, is to provide time in which to produce a slack in the woof-wire after threading between each one of the cams sufficient to provide for the extra length consumed by the swaging out of the woof-wire and the clip after threading. To produce this slack, I provide a series of cam-plates 61 (see Figs. 4 and 4$^a$) on the main shaft, which pass up through slots 220 intermediate between the cams 15 in the bar 59 and the plate 58, the slot 62 in the bar 59 being depended at these points, as is shown by the dotted lines in Fig. 4. Upon the completion of the production of the slack in the woof-wire after threading, as above described, the cams 15 have traveled to the position shown in Fig. 8, whereupon the wedged portions 19, Fig. 10, of the anvil-block 20 have begun to act upon the ends of the clips 56, and the cams controlling the beam 43 force down the beam 43, and hence the punches 57, and force down the clips and woof-wires in the position shown by Fig. 11 by the time the cam-block 20 has traveled forward sufficient to bring the clips upon the plain surface of the block. Hence the clips are flattened out, and the woof-wire is bent to engage the warp-wires at half their circumference, whereupon on the further movement of the cam 15 the anvil-block 20 has passed entirely from beneath the bar 59 and the punches 57, whereupon the punches again descend and force outward from the slot 62 the entire woof-wire, clips, and warp-wires, whereupon the feeding mechanism for the warp-wires is actuated and the warp-wires are fed forward another space, and the operation of threading through another woof-wire is again commenced.

I will now describe the feeding mechanism for the warp-wires in connection with the gearing or connecting mechanism for operating the same and other parts.

Mounted in bearing-blocks 221, Fig. 1, on the side of the frame-piece 1 of the machine is a shaft 222, which is driven intermittently by gear-wheels 69, driven by a mutilated gear 70 on the main shaft 10 of the machine. On this shaft 222 there are nine sets of grooved feed-rolls 65 and nine sets of gears 66 immediately adjacent to the feed-rolls 65. These gears and feed-rolls are spaced across the machine on the shaft 222 to suit the spacing of the cams 15, being the desired position of the warp-wires in the fence. Supported also in blocks 221 is a shaft 98, which is fixed in the blocks 221 and which supports eleven sets of arms 99, having projections 100, which carry feed-rolls 67 and gears 68, the feed-rolls 67 and gears 68 coacting with the feed-rolls 65 and gears 66 on shaft 222. An elastic tension between the feed-rolls is produced by the spring 102 on the rod 101 passing through the I-beam 3 and connected to arms 99, each holding the lower feed-rolls 67 in elastic contact with the feed-rolls 65. There is a set of these arms for each set of feed-rolls and gears. Thus any little variation in the different strands of the warp-wires will not affect the feeding of them. The mutilated gear 70, Fig. 28, is provided with a starting-tooth $70^a$, which engages a starting-tooth $70^b$ of gear 69, and gear 69 is provided with a block $69^a$, which engages the flange on the side of the gear 70, which holds gears 69 rigidly in position at all times except during the period of time the gear-teeth should cause gear 69 to travel, at which points the flange on the gear 70 is cut away to permit the travel of the gear 69 at the proper time. A similar construction for the intermittent gear which drives the feed-rolls for the woof-wire is shown in Figs. 27 and $27^a$. The warp-wire passes up from the feed-rolls to the mechanism whereat is threaded the woof-wire, and thence passing over the idle-roll 110, Fig. 1, and thence passing down to the rolls of the tension device 74, and during the period of rest of the warp-wires during the time in which the woof-wire is threaded a sinuosity is twisted into the warp-wires by means of the coilers 118. (See Figs. 2 and $2^a$.) These coilers are straight spindles mounted in boxes 120 on some angle-bars 223, extending across the machine, and on the coiler-shafts between the boxes 120 there are pinions 117, which are actuated by a rack 119, driven by a link 115, connected to the arm 114, pivoted to a joint 113, connected by a link 112 by another joint to an arm 111, pivoted in a block $111^a$ on I-beam 3, Fig. 27, and carrying a roller $111^b$, engaging a cam $111^c$ on the side of the mutilated gear-wheel 34. (See dotted lines in Fig. 27.) The action of the cam $111^c$ is to throw forward and back the arm 111, and hence revolve the coilers 118 first in one direction and then in the opposite direction back to their normal position, and on the commencement of every revolution of the coilers 118 the lip 222 takes up the warp-wires and winds them upon the body of the coiler, as is shown in Fig. $2^a$, which causes a bend to be made in the stiff spring-wire of the warp-wires which is permanent, and on the unwinding of the coilers the warp-wires are allowed to fall off clear of the coilers, as is shown in Fig. 1. This action of the coilers is done at the period of time during the threading of the woof-wire while the warp-wires are at rest. From the coilers the warp-wires or finished fence, as it is after this point, passes to the tension device, which is a framework 74, holding a set of rollers 75, Fig. 2, which is supported by pivots 76, supported by brackets 77, fastened to I-beam 3, and from the tension device the finished woven-wire fabric or fence is passed directly to the winding-drum or take-up 92. The tension device 74 is connected at each end by links 80, connected by links 79, fastened to the shaft 78, supported in bearing-blocks fastened to I-beams 2 of the machine. On the end of this shaft 78 there is an arm 81, connected by a link 82, which has an adjustable turnbuckle in its body and is connected to an arm 83, pivoted to a block fastened to side brace 5 on that side of the machine. This link 83 is better shown in Fig. 5, and it in turn is connected to an arm 84, pivoted to a bracket $84^a$, fastened to support 96 for the shaft 86 of the winding-drum. This arm 84 is connected by links and a ring to a sliding collar 85, pivoted to a link 87, pivoted to a jaw 88, pivoted in a block $88^a$, and having a jaw 89, which engages the constantly-moving ratchet 90, driven by the sprocket-wheel 73, driven by the sprocket-chain 72 from a sprocket on the main shaft of the machine.

The center of gravity of the tension device 74 is outside of the vertical line of the pivots 76, and hence its action is to fall forward and, as it were, draw forward the fence over the roller 110, and this action is resisted by the tension of the warp-wires, which are held on one end by the feed-rolls 65 and 67 and by the take-up drum on the other side. The action of the take-up drum 92 in winding up the finished fence is automatic by virtue of the gravity action of the tension device 74, which, through the shaft 78, arm 81, and link 82 and mechanism above described, causes the jaw 89 to immediately engage the ratchet 90 the moment that there is sufficient slack in the fence from the tension device to cause sufficient movement of the link mechanism described to cause the jaw 89 to engage the ratchet 90, and this jaw 89 keeps in engagement with the ratchet until the winding-drum 92 has revolved sufficient to wind up the fence to a sufficient tension so that the tension of the fence lifts the tension device 74 sufficient to disengage the jaw 89 from the ratchet 90, the block $88^a$, carrying the jaw 89, being fixed to the shaft 86, to which is fixed a drum-head 91. The drum-head 91 is prevented from backward movement (see Fig. 2) by reason of the pawls 97, fixed in the support 96, which supports shaft 86. The finished fence is removed from the drum 92 by withdrawing the drum 92 from the heads 91 and 93, which is done by the screw-shaft 94, working in the boxes 96 and actuated by a handle 95, (see Figs. 1 and 5,) the drum 92 being made in sections, and is thus easily removed from the coil of fence when withdrawn from the heads 91 and 93.

I will now describe the mechanism for turning over the end of the woof-wire at the top wire of the fence in connection with the gearing or connecting mechanism for operating the same and other parts. (See Figs. 3, 2$^c$, and 2$^d$.)

Fastened to the main shaft at the right-hand side of the machine just beyond the cam 15 for the top wire there is a cam-block 104, having cam-slots 105 106 each and actuating-bars 107 108, which are held by the keeper 108$^a$, fastened to the bar 58. The anvil-block 20 for the cam 15 for the top wire is cut away at the proper point, as is shown by 109. Immediately upon the completion of the threading of the woof-wire and the swaging out of the clip, as is shown by Fig. 2$^d$, and a little behind it in period of time the bar 107 is forced forward, which bends the end of the woof-wire 63 downward, as is shown in Fig. 2$^d$, and should there be a surplus of the wire it is cut off against the shoulder of the aperture 109 in the block 20, whereupon the further movement of the bar 109 bends over and home, the end of the woof-wire, as is shown in Fig. 2$^b$, thus completing the fastening of the fence. The end of the woof-wire for the bottom wire is left to protrude beyond the clip about an inch in length to act as a barb to prevent hogs from rooting under the fence, so no special action of the machine is required for this fastening beyond the cutting off of the wire by the punch 60, which is spaced from the first punch 59 sufficient to leave this length of wire protruding.

It is essential that the clips 56 should enter the aperture 213 and fall into the punch-slot in the bar 59 in the right position, which is that shown in Fig. 8. The inclining of the posts 6, and hence of the surface of the bar, aids in thus depositing the clip, and an additional safeguard is secured by splitting the lower ends of the chutes 55 (see Figs. 7, 9$^b$, and 9$^c$) and pivoting at 227 in the slot thus made a small bent lever, having the long gravity-limb 226 and a short supporting-limb 225 extending when the punch is raised across the punch-slot in the bar 59. The falling clip then comes to rest on said limb 225, and on the descent of the punch the bent lever is tilted, as shown in Fig. 7, and the clip, which cannot get out of place after the punch rests upon it, is carried onward in proper position.

Should the woof-wire at any time fail to feed fully across the warp-wires, vexation might result, and to guard against this I provide means whereby the woof-wire-feed rolls may be turned by hand. Upon the shaft 29, Figs. 3 and 27$^b$, there is fixed a collar 31$^a$, adjacent to the pinion 31, by which the shaft is driven. This pinion is loose upon the shaft, and upon the side opposite the collar a nut 31$^b$ works upon a threaded portion of the shaft to clamp the pinion against the collar, and thus detachably fix it to the shaft, and obviously if the nut be loosened the shaft may be readily turned by hand.

For analogous reasons a construction similar to that just described is used in connection with the feed-roll shaft 222 for the warp-wires.

The machine is driven by two belts, one acting on the press fly-wheel and the other on a fly-wheel 14, Fig. 3. On the shaft of the latter is a pinion 13, which engages a gear 12 on the main shaft 10, which is supported in bearings 11 35 and a bearing in one of the hangers supporting the shaft of the fly-wheel 14.

It is evident that the construction of several of the novel devices found in this machine can be varied without departing from the invention, and it is further clear that certain features can still be employed even though other parts be materially changed or with machines making a very different fence, and I do not therefore wish to limit myself to the exact or any particular constructions and combinations shown and described.

What I claim is—

1. The combination with an intermittently and positively driven series of warp-wire-feed devices, of a tension device for acting upon the warp-wires, a positively-driven clutch-shaft provided with a clutch and a take-up drum for the fabric and intermittently driven from the clutch-shaft, said tension device automatically operating the clutch of the clutch-shaft to engage and drive the take-up drum at all times save only when a sufficient tension is upon the warp-wires or fabric, substantially as specified.

2. The combination with a wire-fence machine adapted to secure the fabric-wires together at their crossing-points by metal clips and having a series of devices for holding a series of clips in line with each other astride a series of warp-wires, and devices for threading a woof-wire through the series of clips, of clip-forming dies, and means for conveying to a series of crossing-points, respectively, the successive clips formed by one set of dies.

3. In a fence-machine, the combination with means for simultaneously feeding forward at intervals a set of spaced warp-wires, of means for placing upon each wire, after such feeding, a U-shaped perforated clip, means for then threading through the perforations in all the clips a woof-wire, and means for then straightening all the clips.

4. In a machine for making wire-fence fabric, the combination with devices for holding a series of clips in line with each other astride a series of warp-wires, and means for automatically feeding a woof-wire across a series of spaced warp-wires, of means for at will disengaging the feeding mechanism from the devices actuating it, whereby the devices for feeding the woof-wire become free to be operated by hand for adjusting the position of the wire.

5. The combination with a machine for forming a wire-fence fabric having a series of longitudinal or warp wires, and having a series of devices for holding a series of clips in line with each other astride a series of warp-wires, and devices for threading a woof-wire through the clips, and devices for bending the clips, of devices arranged to give each of said wires at intervals, permanent, sinuous bends, whereby the fence is made longitudinally elastic.

6. The combination with a fence-machine adapted to secure a series of transverse or woof wires across a series of spaced longitudinal or warp wires, at intervals, of automatic devices arranged to bend back upon itself the projecting end portion of each woof-wire.

7. The combination with a series of devices for holding a series of clips in line with each other astride a series of warp-wires, devices for threading a woof-wire through the series of clips and distinct sets of devices for feeding a set of warp-wires, of means for synchronously operating said devices, and means for at will disengaging any of said devices from the operating mechanism.

8. The combination with sets of clip-forming dies operating in unison, of sets of devices for feeding to said sets of dies, respectively, strips of clip-stock, and means whereby the feeding devices advance to the dies one strip at a time, only.

9. The combination with sets of clip-forming dies, of devices for intermittently feeding to each set a strip of clip-stock, and means whereby certain of the strips are fed at shorter intervals than other strips.

10. The combination with a set of clip-forming dies, of devices adapted to feed a strip of clip-stock to said dies at regular intervals, and devices arranged to permit such feeding during a certain period of time and to prevent such feeding during a succeeding period of predetermined length.

11. The combination with a set of clip-forming dies, of means for feeding clip-stock thereto, a clip-guide leading from said dies, and an automatic switch arranged to deliver a certain number of the successively-formed clips at different points, respectively.

12. The combination with a set of clip-forming dies and devices for feeding clip-stock thereto, of a flexible clip-guide arranged to receive the clips from said dies, means for flexing said guide by successive steps, and a set of fixed strip-guides arranged to aline, respectively, with the flexible guide at the completion of its successive steps.

13. The combination with a die-plate having a small and a larger opening, of devices for intermittently feeding a strip across said openings, a reciprocating die arranged to coact with the first opening in perforating the strip, a headed mandrel crossing the second opening in the rear of the plate's face, a forked die adapted to coact with the second opening to cut from the strip a portion previously perforated and double it over the mandrel, and means for moving the mandrel longitudinally to discharge the doubled clip.

14. The combination with a clip-forming die-plate, of devices for intermittently feeding a strip across an opening therein, a mandrel crossing the opening in the rear of the plate's face, and a forked die arranged to cut a clip from said strip and in its further advance to double the clip centrally over the mandrel.

15. The combination with devices for forming U-shaped clips, of a clip-guide arranged to receive said clips and lie between their branches, and a second guide following the course of the first and lying contiguous throughout to the middle outer surface of clips passing upon the first.

16. The combination with a plate provided with a narrow slot continuous at one end with a larger opening, of a parallel plate at a clip's width from the first, having a similar slot terminating at the opposite end in a larger opening, a flat clip-guide passing through and fitting laterally in both said slots, and means for reciprocating said plates together; whereby a clip pressing forward upon the guide is arrested by the first plate, allowed to pass as the advance of the plate brings the large opening in registering position, arrested by the second plate, and allowed to pass through the plate as the retraction of the latter brings its large opening in registering position.

17. The combination of a device engaging a clip between the limbs thereof with a bar provided with a transverse punchway and with a lateral opening to admit clips thereto, a guide arranged to bring clips to said opening, a stop normally supporting each clip after it enters the punchway, and a punch arranged to reciprocate in said punchway past said opening, said stop being arranged to move out of the way as the punch descends past the opening.

18. The combination with a rigid bar having in one edge transverse grooves to receive the warp-wires of a fence, a longitudinal groove for a woof-wire, and punchways perpendicular to the plane of the wires at their intersections, anvil-blocks lying below said punchways respectively, means for delivering a perforated U-shaped clip in each punchway and astride the corresponding warp-wire, means for threading a woof-wire through said clips, and punches reciprocating in the punchways, respectively.

19. The combination with means for holding a warp-wire, of means for placing a perforated U-shaped clip astride said wire, means for passing a woof-wire through the perforations in the clip, a rotary block having in the plane of the clip a gradually-widening segmental rib to move between and spread the clip branches, means for forcibly rotating the block, and means for flattening the clip against the block after its ends have been so spread.

20. The combination with a rigid bar grooved transversely to receive a series of warp-wires and longitudinally to receive a woof-wire, of means for placing such wires in the grooves respectively, means for securing the woof-wire to each warp-wire while both are held in the grooves, and means for then dropping all said wires out of the grooves to allow feeding of the fabric.

21. The combination with a rigid bar provided with transverse grooves to receive respectively a set of warp-wires, and with a shallower groove to receive a woof-wire, of means for covering the latter groove between the warp-wire grooves to form a closed passage, and means for threading a woof-wire through said passage.

22. The combination with a wire-fence machine adapted to secure the fabric-wires together at their crossing-points by metal clips and having a series of devices for holding a series of clips astride a series of warp-wires, a guide for directing a woof-wire through the series of clips, of a positively-driven warp-wire feed, a positively-driven fabric-winding drum, and means whereby undue tension on the fabric delays the rotation of the drum.

23. The combination with a wire-fence machine adapted to secure the fabric-wires together at their crossing-points by metal clips and having a series of devices for holding a series of clips astride a series of warp-wires, a guide for directing a woof-wire through the series of clips, of a plurality of clips forming dies, and means for conveying to the crossing-points the clips formed by the dies.

24. The combination with a wire-fence machine adapted to secure the fabric-wires together at their crossing-points by metal clips and having a series of devices for holding a series of clips astride a series of warp-wires, a guide for directing a woof-wire through the series of clips, of clip-forming dies, means for conveying the clips formed by the dies to magazines, and means for removing from each magazine a single clip at a time.

25. The combination with a wire-fence machine adapted to secure the fabric-wires together at their crossing-points by metal clips and having a series of devices for holding a series of clips astride a series of warp-wires, a guide for directing a woof-wire through the series of clips, of a magazine for holding a quantity of clips, and means for taking from the magazine a single clip at a time and placing the same upon the warp-wires.

26. The combination with a wire-fence machine adapted to secure the fabric-wires together at their crossing-points by metal clips, of a chuteway for the clip at each warp-wire, and means for holding the clip exactly in position on the warp-wire, and means for threading the woof-wire through the clip so held.

27. The combination with a wire-fence machine adapted to secure the fabric-wires together at their crossing-points by metal clips, of a clip-chuteway for each warp-wire, means for holding the clips received from the chuteway rigidly in position upon the warp-wire, means for threading through the clip so held the woof-wire, and means for bending the clip and the woof-wire after the threading of the woof-wire.

28. The combination with a wire-fence machine adapted to secure the fabric-wires together at their crossing-points by metal clips, of a device for holding the clips in position upon the warp-wires, means for threading through the clips so held the woof-wire from a continuous roll of wire, and means for cutting off the woof-wire from the main roll after the threading.

29. The combination with a wire-fence machine adapted to secure the fabric-wires together at their crossing-points by metal clips, of means for holding in exact position upon the wire the metal clips, and means for threading through the clip so held the woof-wire, and a reciprocating punch coacting with a die-block for bending out the clip to a locking position upon the woof-wire.

30. The combination with a wire-fence machine adapted to secure the fabric-wires together at their crossing-points by metal clips, of a device for holding the clips in position to be threaded upon the warp-wires, and means for threading through the clips so held the woof-wire, and reciprocating punches coacting with a movable die for bending out the clips upon the woof-wire.

31. The combination with a wire-fence machine adapted to secure the fabric-wires together at their crossing-points by metal clips, of devices for holding in exact position the warp-wires, and devices for holding upon the warp-wires the clips, and means for threading through the clips so held the woof-wire, and means for bending out the clips to a locking position upon the warp-wires, and means for positively releasing and freeing from the holding, threading, and bending devices, the wires thus fixed together.

32. The combination with a wire-fence machine adapted to secure the fabric-wires together at their crossing-points by metal clips, of means for holding the warp-wires, and means for holding in exact position upon the warp-wires so held the clips, and an inclosed guideway for directing the passage of the woof-wire to the apertures in the clips, and means for threading the woof-wire through this aperture and through the clips.

33. The combination with a wire-fence machine adapted to secure the fabric-wires together at their crossing-points by metal clips, of means for holding the warp-wires, and means for holding in exact position upon the warp-wires so held the clips, and an inclosed guideway for directing the passage of the woof-wire to the apertures in the clips, and means for threading the woof-wire through this aperture and through the clips, and means for opening the inclosed guideway for the discharge of the woof-wire after threading.

34. The combination with a wire-fence machine adapted to secure the fabric-wires together at their crossing-points by metal clips, of means for holding the clips and woof-wires together in exact position for threading, and a guideway for directing the course of the woof-wire in threading, with intermittent actuated feed-rolls for feeding the woof-wire across through the clips.

35. The combination with a wire-fence machine adapted to secure the fabric-wires together at their crossing-points by metal clips, of means for holding the clips and woof-wire together in position for threading, and a plurality of sets of feed-rolls located at different points in the path of the travel of the woof-wire for feeding across the woof-wire.

36. The combination with a wire-fence machine adapted to secure the fabric-wires together at their crossing-points by metal clips, of devices for holding the clips and woof-wires together in position for threading, and a plurality of sets of feed-rolls for feeding across through the clips the woof-wires, and means for releasing some of the rolls from contact with the woof-wire after threading, thereby permitting the free discharge of the threaded woof-wire.

37. The combination with a wire-fence machine adapted to secure the fabric-wires together at their crossing-points by metal clips and having a series of devices for holding a series of clips astride a series of warp-wires, a guide for directing a woof-wire through the series of clips, of clip-forming dies, and a chuteway or magazine receiving from the dies in regular position the clips as discharged by the dies.

38. In a machine for manufacturing woven or stay wire fence, wherein the transverse or stay wires are secured to the fence or strand wires by sheet-metal clips through which the stay-wires are inserted, the combination with means for holding a series of strand-wires in line with each other, with devices for holding a series of clips astride the strand-wires and in line with each other, and devices for guiding or directing a stay or woof wire through the series of metal clips, substantially as specified.

39. In a machine for manufacturing woven or stay wire fence, wherein the transverse or stay wires are secured to the fence or strand wires by sheet-metal clips through which the stay-wires are inserted, the combination with means for holding a series of strand-wires in line with each other, with devices for holding a series of clips astride the strand-wires and in line with each other, devices for guiding or directing a stay or woof wire through the series of metal clips, and devices for spreading or bending the clips to tighten them on the fence-wires and stay-wire, substantially as specified.

40. The combination with a series of devices for holding a series of strand-wires in line with each other, of a series of devices for holding a series of clips astride the fence-wire and in line with each other, and a two-part opening and closing guide for directing the stay-wire through the series of clips, substantially as specified.

41. The combination with a series of devices for holding a series of strand-wires in line with each other, of a series of devices for holding a series of clips astride the fence-wire and in line with each other, of a two-part opening and closing guide for directing the stay-wire through the series of clips, and cutters for severing the stay from the stay-wire, substantially as specified.

42. The combination with a series of devices for holding a series of strand-wires in line with each other, of a series of devices for holding a series of clips astride the fence-wire and in line with each other, of a two-part opening and closing guide for directing the stay-wire through the series of clips, and feed devices for the stay-wire, substantially as specified.

43. The combination with a series of devices for holding a series of strand-wires in line with each other, of a series of devices for holding a series of clips astride the fence-wire and in line with each other, a two-part opening and closing guide for directing the stay-wire through the series of clips, and a series of feed devices for the strand-wires, substantially as specified.

44. The combination with a series of devices for holding a series of strand-wires in line with each other, of a series of devices for holding a series of clips astride the fence-wire and in line with each other, a two-part opening and closing guide for directing the stay-wire through the series of clips, and a series of devices for setting the clips to fasten them on the stay and strand wires, substantially as specified.

45. The combination with a series of devices for holding a series of strand-wires in line with each other, of a series of devices for holding a series of clips astride the fence-wire and in line with each other, of a two-part opening and closing guide for directing the stay-wire through the series of clips, and a device for bending the end of the stay-wire about the marginal wire of the fabric, substantially as specified.

46. The combination with a series of guides or chutes for the clips, of a series of devices for feeding the clips one by one, a series of devices for holding a series of clips in line with each other astride the series of strand-wires, and a two-part opening and closing guide for directing a stay or woof wire through the series of clips, substantially as specified.

47. The combination with a series of guides or chutes for the clips, of a series of devices for feeding the clips one by one, a series of devices for holding a series of clips in line with each other astride the series of strand-wires, a two-part opening and closing guide for directing a stay or woof wire through the series of clips, and a series of devices for setting or bending the clips, substantially as specified.

48. The combination with a series of guides or chutes for the clips, of a series of devices for feeding the clips one by one, a series of devices for holding a series of clips in line with each other astride the series of strand-wires, a two-part opening and closing guide for directing a stay or woof wire through the series of clips, and devices for feeding the stay-wire through said guide, substantially as specified.

49. The combination with a series of guides or chutes for the clips, of a series of devices for feeding the clips one by one, a series of devices for holding a series of clips in line with each other astride the series of strand-wires, a two-part opening and closing guide for directing a stay or woof wire through the series of clips, devices for feeding the stay-wire through said guide, and a series of clip-bending devices, substantially as specified.

50. The combination with a series of guides or chutes for the clips, of a series of devices for feeding the clips one by one, a series of devices for holding a series of clips in line with each other astride the series of strand-wires, a two-part opening and closing guide for directing a stay or woof wire through the series of clips, devices for feeding the stay-wire through said guide, a series of clip-bending devices, and devices for cutting the stay from the stay-wire, substantially as specified.

51. The combination with a series of guides or chutes for the clips, of a series of devices for feeding the clips one by one, a series of devices for holding a series of clips in line with each other astride the series of strand-wires, a two-part opening and closing guide for directing a stay or woof wire through the series of clips, devices for feeding the stay-wire through said guide, a series of clip-bending devices, devices for cutting the stay from the stay-wire, and a drum or reel for winding up the fabric, substantially as specified.

52. The combination with a series of devices for holding a series of clips astride a series of strand-wires in line with each other, of a device for guiding or directing a stay-wire through the series of clips, and mechanism for swaging or bending the clips to fasten them in position, substantially as specified.

53. The combination with a series of devices for holding a series of clips astride a series of strand-wires in line with each other, of a device for guiding or directing a stay-wire through the series of clips, mechanism for swaging or bending the clips to fasten them in position, a series of clip-feed chutes or guides, a series of clip-feed devices, and mechanism for delivering the clip-feed chutes or guides, substantially as specified.

54. The combination with a series of chutes or guides for the clips, a series of clip-feed devices, a series of devices for holding a series of clips in line with each other, a series of guides or devices for holding or supporting a series of warp-wires in position, and a series of devices for assembling the clips and warp-wires, substantially as specified.

55. The combination with a series of chutes or guides for the clips, a series of clip-feed devices, a series of devices for holding a series of clips in line with each other, a series of guides or devices for holding or supporting a series of warp-wires in position, a series of devices for assembling the clips and warp-wires, a guide for directing the woof-wire through the series of clips, substantially as specified.

56. The combination with a series of chutes or guides for the clips, a series of clip-feed devices, a series of devices for holding a series of clips in line with each other, a series of guides or devices for holding or supporting a series of warp-wires in position, a series of devices for assembling the clips and warp-wires, a guide for directing the woof-wire through the series of clips, and devices for feeding the woof-wire forward at intervals, substantially as specified.

57. The combination with a series of chutes or guides for the clips, a series of clip-feed devices, a series of devices for holding a series of clips in line with each other, a series of guides or devices for holding or supporting a series of warp-wires in position, a series of devices for assembling the clips and warp-wires, a guide for directing the woof-wire through the series of clips, devices for feeding the woof-wire forward at intervals, and a series of devices for feeding the warp-wires forward at intervals, substantially as specified.

58. The combination with a series of chutes or guides for the clips, a series of clip-feed devices, a series of devices for holding a series of clips in line with each other, a series of guides or devices for holding or supporting a series of warp-wires in position, a series of devices for assembling the clips and warp-wires, a guide for directing the woof-wire through the series of clips, devices for feeding the woof-wire forward at intervals, a series of devices for feeding the warp-wires forward at intervals, and a series of devices for setting or bending the series of clips, substantially as specified.

59. The combination with a series of chutes or guides for the clips, a series of clip-feed devices, a series of devices for holding a series of clips in line with each other, a series of guides or devices for holding or supporting a series of warp-wires in position, a series of devices for assembling the clips and warp-wires, a guide for directing the woof-wire through the series of clips, devices for feeding the woof-wire forward at intervals, a series of devices for feeding the warp-wires forward at intervals, a series of devices for setting or bending the series of clips, and devices for cutting off the woof-wire, substantially as specified.

60. The combination with a series of chutes or guides for the clips, a series of clip-feed devices, a series of devices for holding a series of clips in line with each other, a series of guides or devices for holding or supporting a series of warp-wires in position, a series of devices for assembling the clips and warp-wires, a guide for directing the woof-wire through the series of clips, devices for feeding the woof-wire forward at intervals, a series of devices for feeding the warp-wires forward at intervals, a series of devices for setting or bending the series of clips, devices for cutting off the woof-wire, and a device for bending the woof-wire about the marginal clip, substantially as specified.

61. The combination with a series of chutes or guides for the clips, a series of clip-feed devices, a series of devices for holding a series of clips in line with each other, a series of guides or devices for holding or supporting a series of warp-wires in position, a series of devices for assembling the clips and warp-wires, a guide for directing the woof-wire through the series of clips, devices for feeding the woof-wire forward at intervals, a series of devices for feeding the warp-wires forward at intervals, a series of devices for setting or bending the series of clips, devices for cutting off the woof-wire, a device for bending the woof-wire about the marginal clip, and a drum or reel for taking upon the finished fabric, substantially as specified.

62. The combination with a series of devices for holding a series of clips in line with each other, and devices for holding a series of warp-wires in line with each other, and means for assembling the clips and warp-wires, substantially as specified.

63. The combination with a series of devices for holding a series of clips in line with each other, and devices for holding a series of warp-wires in line with each other, means for assembling the clips and warp-wires, and a guide for the woof-wire, substantially as specified.

64. The combination with a series of devices for holding a series of clips in line with each other, and devices for holding a series of warp-wires in line with each other, means for assembling the clips and warp-wires, a guide for the woof-wire, and a series of devices for bending the clips, substantially as specified.

65. The combination with a series of devices for holding a series of clips in line with each other astride a series of strand-wires, with means for threading the warp-wires through the series of clips, and a series of clip-bending devices for fixing the clips in position on the warp-wire and strand-wires, substantially as specified.

66. The combination with a series of devices for feeding a series of strand-wires forward at intervals, with a device for feeding a transverse or woof wire across the strand-wires, and a series of devices for feeding a series of clip-strips forward at intervals, substantially as specified.

67. The combination with a series of devices for feeding a series of strand-wires forward at intervals, with a device for feeding a transverse or woof wire across the strand-wires, and a series of devices for feeding a series of clip-strips forward at intervals, and a series of devices for cutting clips from the series of clip-strips, substantially as specified.

68. The combination with a series of clip-strip-feed devices and a series of clip-cutters, of a series of devices for bending the clips to secure them in place at the crossings of the strand and stay wires, substantially as specified.

69. In a woven-wire-fence machine, the combination with a series of devices for bending a series of clips to secure them in position at the crossings of the series of strand-wires and the stay-wire, of mechanism for automatically operating the said series of clip-bending devices, substantially as specified.

70. In a woven-wire-fence machine, the combination with a series of devices for bending a series of clips to secure them in position at the crossings of the series of strand-wires and the stay-wire, of mechanism for automatically operating the said series of clip-bending devices, and a series of devices for cutting a series of clips from a series of clip-strips, substantially as specified.

71. The combination in a woven-wire-fence machine wherein the stay-wire is secured to a series of strand-wires by a series of clips, of mechanism for supporting and feeding a series of strand-wires, with mechanism for guiding and feeding a transverse or stay wire across the strand-wires, and mechanism for bending a series of clips to secure them in position on the stay and strand wires at the crossings of the same, substantially as specified.

72. The combination in a woven-wire-fence machine wherein the stay-wire is secured to a series of strand-wires by a series of clips, of mechanism for supporting and feeding a series of strand-wires, with mechanism for guiding and feeding a transverse or stay wire across the strand-wires, mechanism for bending a series of clips to secure them in position on the stay and strand wires at the crossings of the same, and a series of clip cutting and forming dies, substantially as specified.

73. The combination in a woven-wire-fence machine wherein the stay-wire is secured to a series of strand-wires by a series of clips, of mechanism for supporting and feeding a series of strand-wires, with mechanism for guiding and feeding a transverse or stay wire across the strand-wires, mechanism for bending a series of clips to secure them in position on the stay and strand wires at the crossings of the same, a series of clip cutting and forming dies, and a series of clip-strip-feed devices, substantially as specified.

74. In a machine for making woven-wire fence wherein the stay-wire is secured to the strand-wires by a series of metal clips, the combination with mechanism for assembling the clips, stay-wire and strand-wires, with mechanism for bending the clips to secure them on the strand and stay wires at the crossings of the same, substantially as specified.

75. In a machine for making woven-wire fence wherein the stay-wire is secured to the strand-wires by a series of metal clips, the combination with mechanism for assembling the clips, stay-wire and strand-wires, with mechanism for bending the clips to secure them on the strand and stay wires at the crossings of the same, and mechanism for cutting the clips from a series of clip-strips, substantially as specified.

76. The combination with a series of devices for feeding a series of strand-wires, of a guide and feed device for the stay-wire, and a series of mechanisms for bending a series of clips and a stay-wire in respect to a series of strand-wires for securely uniting the clips and stay-wire to the strand-wires, substantially as specified.

77. The combination with a series of devices for bending a series of clips and a stay-wire in respect to a series of strand-wires, of means for producing slack in the stay-wire to give the stock consumed in forming the bends in the stay-wire, substantially as specified.

78. In a machine for making woven-wire fence wherein the stay-wire is secured to the series of strand-wires by a series of clips, a series of devices for forming bends in the stay-wire at the crossings of the stay-wire with the strand-wire, in combination with devices for feeding the strand-wires forward and a take-up reel for the finished fabric substantially as specified.

In witness whereof I have hereunto subscribed my name, in the presence of two subscribing witnesses, on this 24th day of August, 1896.

WILLIAM ERASTUS WILLIAMS.

Witnesses:
WALLACE GREENE,
C. M. IRELAN.